US008506857B2

(12) United States Patent
Nishimoto et al.

(10) Patent No.: US 8,506,857 B2
(45) Date of Patent: Aug. 13, 2013

(54) INJECTION COMPRESSION MOLDING METHOD OF LENS

(75) Inventors: Tatsuo Nishimoto, Tokyo (JP); Kiyohiro Saito, Tokyo (JP); Kenji Tanagawa, Tokyo (JP); Tetsuya Uchida, Tokyo (JP)

(73) Assignee: Hoya Corporation, Tokyo (JP)

( * ) Notice: Subject to any disclaimer, the term of this patent is extended or adjusted under 35 U.S.C. 154(b) by 1024 days.

(21) Appl. No.: 11/987,792

(22) Filed: Dec. 4, 2007

(65) Prior Publication Data

US 2008/0093756 A1 Apr. 24, 2008

Related U.S. Application Data

(62) Division of application No. 10/281,174, filed on Oct. 28, 2002, now Pat. No. 7,326,375.

(30) Foreign Application Priority Data

| Oct. 30, 2001 | (JP) | 2001-333245 |
| Dec. 5, 2001 | (JP) | 2001-371976 |
| Dec. 18, 2001 | (JP) | 2001-385158 |

(51) Int. Cl.
*B29D 11/00* (2006.01)
(52) U.S. Cl.
USPC .............................. 264/2.2; 264/2.5; 425/808
(58) Field of Classification Search
USPC .................. 264/1.1, 2.2, 2.5, 328.7; 425/808
See application file for complete search history.

(56) References Cited

U.S. PATENT DOCUMENTS

| 4,370,116 A | 1/1983 | Groom |
| 4,466,477 A | 8/1984 | Alofs |
| 4,685,876 A | 8/1987 | Loscei |
| 4,828,769 A | 5/1989 | Maus et al. |
| 5,161,594 A | 11/1992 | Bolton et al. |
| 5,855,824 A | 1/1999 | Saito et al. |
| 5,906,777 A | 5/1999 | Kamiguchi et al. |
| 5,945,047 A | 8/1999 | Yukihiro et al. |
| 7,326,375 B2 * | 2/2008 | Nishimoto et al. ............ 264/2.2 |
| 2001/0031292 A1 | 10/2001 | Ito et al. |

FOREIGN PATENT DOCUMENTS

| EP | 0 700 768 A1 | 3/1996 |
| EP | 0 968 807 A1 | 1/2000 |
| JP | 62-222820 | 9/1987 |

(Continued)

OTHER PUBLICATIONS

Office Action dated Nov. 20, 2009 for U.S. Appl. No. 11/987,791.

*Primary Examiner* — Mathieu D. Vargot
(74) *Attorney, Agent, or Firm* — Oliff & Berridge, PLC

(57) ABSTRACT

An injection compression molding method of a lens is provided, where a toggle link mechanism (65) is actuated to close a molding die (50) and a movable die plate (64) is moved to a position establishing a cavity thickness of greater than a thickness of an article to be molded while the die is closed. After injecting a molten resin into the cavity, the molten resin is sealed in the cavity and the toggle link mechanism (65) is actuated to advance the movable die plate (64) toward a fixed die plate (61), the relative position of a rear die plate (62) and the movable die plate (64) is made constant at a position where extension of a tie bar (63) becomes a predetermined value, and the molten resin is cooled for a predetermined time after completion of pressurizing the resin.

3 Claims, 17 Drawing Sheets

(56) References Cited

FOREIGN PATENT DOCUMENTS

| JP | 05-124072 | 5/1993 |
| JP | 06-304983 | 1/1994 |
| JP | 6-9826 | 3/1994 |
| JP | 07-009518 | 1/1995 |
| JP | 08-238655 | 9/1996 |
| JP | A 9-216263 | 8/1997 |
| JP | A 9-234774 | 9/1997 |
| JP | A 9-277327 | 10/1997 |
| JP | 10-249902 | 9/1998 |
| JP | 11-240055 | 9/1999 |

* cited by examiner

INJECTION COMPRESSION MOLDING METHOD OF LENS

This is a Division of application Ser. No. 10/281,174 filed Oct. 28, 2002, now U.S. Pat. No. 7,326,375. The disclosure of the prior application is hereby incorporated by reference herein in its entirety.

BACKGROUND OF THE INVENTION

1. Field of the Invention

The present invention relates to injection compression molding method and machine of a lens for injecting and compressing thermoplastic resin to mold a lens. More specifically, it relates to an injection compression molding method and an injection compression molding machine of a lens capable of reducing sink mark and strain, restraining strain of molding article, and easily changing the thickness of the molding article, which is suitable for molding a spectacles-lens.

2. Description of Related Art

Conventionally, an injection compression molding method is known as a method for molding spectacles lenses using thermoplastic resin.

In the injection compression molding method, in order to compensate shrinkage of molten resin to obtain uniform and high shape accuracy, molding die is clamped while retaining compression margin inside the spectacles-lens molding cavity, the molten resin is injected and filled in the spectacles-lens molding cavity, the molding die is compressed by the compression margin and the molten resin is cooled to obtain the spectacles-lens (see Japanese Patent Laid-Open Publication No. Hei 9-277327 and Japanese Patent Laid-Open Publication No. Hei 9-216263).

Since a meniscus lens used as a spectacles-lens is a thick molding article having thickness difference between the central portion and peripheral portion thereof, the cooling time has to be taken long in order to restrain the sink mark, shrinkage deformation, internal strain etc, which lengthen molding cycle.

Japanese Patent Laid-Open Publication No. Hei 9-234774 discloses a cooling time of 230 seconds for molding a minus lens (a lens having thicker peripheral portion than the central portion) of 76 mm diameter and lens power of −4.00 D (diopter).

In the above cooling step, the molten resin compressed in the molding die clamped by a predetermined clamping force loses resin pressure thereof inside the molding die in accordance with molding shrinkage due to cooling. The resin pressure gradually decreases in accordance with the progress of cooling and, after completion of cooling, the molding article is released from the molding die during ejecting step.

In order to obtain a lens with high accuracy, it is important to restrain the sink mark, shrinkage deformation, internal strain and deformation during die-releasing step as well as raising the transferability for accurately transferring the concave and convex shape of the spectacles-lens molding cavity to the lens. Accordingly, a cooling step for uniformly and sufficiently cooling the entire molten resin filled in the spectacles-lens-molding cavity is required.

In the conventional injection compression molding method, the molten resin is cooled for a predetermined time while keeping the pressure applied to the resin at a predetermined level during the cooling step, and the molding die is rapidly parted to reduce the pressure applied to the resin instantly. Accordingly, deformation is likely to be caused on the molding article during the die-releasing step if the cooling time is not sufficient.

Further, there can be partial parting (peeling) between the dies and the molding article according the manner for opening the dies during the die-releasing step, which causes parting failure of so-called "separation".

Further, the lens thickness has to be changed in accordance with lens characteristics, e.g. lens power (such as spherical power and astigmatic power) in molding a spectacles-lens including finished lens and semi-finished lens.

In the conventional method, since the lens is obtained by compressing the molding die for a predetermined compression margin, i.e., since the cavity is reduced to a position for giving a desired thickness of final product, in order to change the thickness of a lens, a molding die having a cavity of final thickness of molding article has to be prepared for each lens and the molding article has to be changed in accordance with the lens to be molded.

Accordingly, a plurality of types of molding dies have to be prepared and much production cost is necessary, and additional work is required for exchanging the molding die, thereby deteriorating production efficiency.

SUMMARY OF THE INVENTION

An object of the present invention is to provide an injection compression molding method of a lens and an injection compression molding machine capable of reducing sink mark and strain and shortening molding cycle.

An injection compression molding method of a lens according to an aspect of the present invention is for molding a lens of a thermoplastic resin, the method comprising the steps of: providing a molding machine having a tie bar for mutually connecting a pair of space-retaining plates, a movable die plate movable along the tie bar, a molding die provided between a first space-retaining plate of the pair of the space-retaining plates and the movable die plate and accommodating a lens-molding cavity including a pair of cavity forming members thereinside for shaping concave and convex surface of the lens, and an advancement-retraction mechanism provided between a second space-retaining plate of the space-retaining plates and the movable die plate for advancing and retracting the movable die plate relative to the first space-retaining plate, the lens-molding cavity being reduced when the movable die plate advances toward the first space-retaining plate while the molding die is closed; actuating the advancement-retraction mechanism to close the molding die and to move the movable die plate to a position for the thickness of the lens-molding cavity to be thicker than a thickness of a molding article while the molding die is closed; injecting a thermoplastic molten resin into the lens-molding cavity defined while setting the volume of the cavity and sealing in the molten resin inside the molding die; actuating the advancement-retraction mechanism to advance the movable die plate toward the first space-retaining plate, keeping a constant relative position between the second space-retaining plate and the movable die plate where the extension of the tie bar becomes a predetermined value in accordance with the characteristics of the lens and pressurizing the molten resin; and cooling the molten resin for a predetermined time after completion of pressurizing the resin.

According to the above injection compression molding method of a lens, the molding die is closed by actuating the advancement-retraction mechanism during the cavity volume setting step, and the movable die plate is moved to a position where the thickness of the lens-molding cavity becomes greater than the thickness of the article to be molded while the die is closed.

Subsequently, during resin injection seal-in step, the molten resin is injected into the lens-molding cavity. Since the thickness of the lens-molding cavity is enlarged greater than the thickness of the article to be molded, inappropriate resin resistance against the molding die is not generated and injection and filling of the resin can be smoothly conducted during injection of the molten resin. The molten resin injected into the cavity is sealed in the molding die. In other words, the molten resin is prevented from returning (backflowing) to the outside of the molding die.

Next, during resin pressurizing step, the movable die plate is advanced toward the first space-retaining plate by actuating the advancement-retraction mechanism. At this time, since the molten resin is filled and sealed in the molding die including the lens-molding cavity, the relative position between the second space-retaining plate and the movable die plate is kept constant at a position where the tie bar is extended and the extension of the tie bar becomes a predetermined value. Then, the reaction force of the extension of the tie bar works on the molten resin inside the lens-molding cavity through the movable die plate. In other words, the molten resin inside the lens-molding cavity is pressurized by the reaction force of the tie bar extension. Incidentally, the resin pressurizing step may be started after, simultaneously with, or immediately before completion of injecting and filling the resin.

Lastly, during the cooling step, the molten resin is cooled for a predetermined time after completion of the resin pressurizing step. Then, the molten resin inside the lens-molding cavity is cooled while being compressed, which is gradually solidified and shrunk in accordance with progress of the cooling. The movable die plate gradually advances in accordance with the shrinkage of the resin. When the movable die plate advances, the space between the pair of the space-retaining plates are reduced, i.e. the elasticity of the tie bar is recovered, thereby gradually lowering the pressure applied to the molten resin inside the lens-molding cavity.

Thus, in accordance with the solidification and shrinkage of the molten resin inside the lens-molding cavity being gradually cooled, the pressure applied to the molten resin inside the lens-molding cavity can be gradually lowered through the advancement of the movable die plate and the recovery of the tie bar elasticity. Accordingly, the entirety of the obtained molding article can be uniformly cooled, so that the sink mark and strain can be reduced and cooling time, the entire molding cycle as well, can be reduced. For reference, the die-releasing step can be started after cooling time of eighty seconds for molding a lens of 76 mm diameter and lens power of −4.00 D (diopter) according to the method of the present invention.

In the above, the molding die may preferably have a fixed die fixed to the first space-retaining plate and having one of the pair of the cavity forming members constituting the lens-molding cavity thereinside and a movable die fixed to the movable die plate, and the movable die may preferably have a die body having the other of the pair of the cavity forming member constituting the lens-molding cavity thereinside, a die attachment fixed to the movable die plate and movably holding the die body relative to the fixed die, and a resilient member interposed between the die attachment member and the die body, the die attachment member and the die body being capable of being opened and closed by a predetermined gap by the resilient member.

Accordingly, during the cavity volume setting step, the fixed die and the movable die are closed by actuating the advancement-retraction mechanism and, while the dies are closed, the movable die plate is advanced to move the die attachment member and the die body toward each other while compressing the resilient member, so that the thickness of the lens-molding cavity can be set at a predetermined thickness greater than the thickness of the article to be molded. In other words, only by advancing the movable die plate by actuating the advancement-retraction mechanism, the molding die can be closed and the thickness of the lens-molding cavity can be set at the predetermined thickness while the molding die is closed.

In the above, a toggle link mechanism may preferably be used as the advancement-retraction mechanism, the toggle link mechanism being stretched to close the molding die and the distance between the pair of space-retaining plates being adjusted so that the extension of the tie bar becomes a predetermined value when the toggle link mechanism is moved to an extension limit thereof to establish a minimum volume of the lens-molding cavity, thereby adjusting a clamp force, and the toggle link mechanism may preferably be actuated to the extension limit thereof while pressurizing the resin.

Accordingly, since a clamping force adjusting step where the toggle link mechanism is stretched to close the molding die and the distance between the pair of space-retaining plates is adjusted so that the extension of the tie bar becomes a predetermined value when the toggle link mechanism is moved to an extension limit thereof to establish a minimum volume of the lens-molding cavity is provided, the operation during the resin pressurizing step can be facilitated.

Specifically, by adjusting the distance between the pair of space-retaining plates so that the extension of the tie bar becomes a predetermined value ($\Delta L$, for instance) when the toggle link mechanism is advanced to the extension limit thereof to set the minimum volume of the lens-molding cavity, it is only necessary to drive the toggle link mechanism to the extension limit during the resin pressurizing step. The extension of the tie bar during the resin pressurizing step is equal to the sum of the extension ($\Delta L$) during the clamping force adjusting step and the extension ($\alpha$) of the tie bar due to incomplete closing of the molding die on account of the resin volume inside the lens-molding cavity, so that it is only necessary to drive the toggle link mechanism to the extension limit during the resin pressurizing step after setting the extension ($\Delta L$) considering the extension ($\alpha$) during the clamping force adjusting step.

The molding die is designed so that the thickness of the lens-molding cavity of the molding die becomes smaller than the thickness of an article to be molded when the toggle link mechanism is moved to the extension limit thereof.

In the above, the second space-retaining plate may preferably be moved toward and away from the first space-retaining plate for adjusting the clamp force.

Ordinarily, a die thickness adjuster for adjusting the space between the space-retaining plates by moving one of the space-retaining plates toward and away from the other is provided to an injection compression machine, and the second space-retaining plate can be moved toward and away from the first space-retaining plate using the die thickness adjuster.

In the above, a shutting member may preferably be projected into a sprue in communication with the lens-molding cavity through a runner to shut a nozzle channel for injecting the molten resin after injecting the molten resin into the lens-molding cavity.

According to the above arrangement, since an operation for projecting the shutting member to the nozzle channel is only required, when the molten resin is completely injected into the lens-molding cavity, the injected molten resin can be immediately sealed therein. Therefore, even when the resin pressurizing step is started immediately before completion of injection, the resin backflow can be securely prevented.

Another object of the present invention is to provide an injection compression molding method of a lens capable of restraining the deformation of the molding article during die-releasing step.

An injection compression molding method of a lens according to another aspect of the present invention is for molding a lens of a thermoplastic resin, the method comprising: providing step for providing a molding machine having a tie bar for mutually connecting a pair of space-retaining plates, a movable die plate movable along the tie bar, a molding die provided between a first space-retaining plate of the pair of the space-retaining plates and the movable die plate and having a fixed die and a movable die moving toward and away from the fixed die, the fixed die and the movable die respectively having a cavity forming member for shaping concave and convex surface of the lens, the cavity forming member of the fixed die and the cavity forming member of the movable die forming a lens-molding cavity, and an advancement-retraction mechanism provided between a second space-retaining plate of the space-retaining plates and the movable die plate for advancing and retracting the movable die plate relative to the first space-retaining plate, the lens-molding cavity being reduced when the movable die plate advances toward the first space-retaining plate while the molding die is closed; cavity-volume setting step for closing the molding die and moving the cavity forming member of the movable die to a position where the thickness of the lens-molding cavity becomes a predetermined thickness greater than the thickness of an article to be molded; resin injection seal-in step for injecting a thermoplastic molten resin into the lens-molding cavity established in setting the volume of the cavity and sealing the molten resin injected to the lens-molding cavity; resin pressurizing step for advancing the cavity forming member of the movable die toward the cavity forming member of the fixed die to compress the molten resin injected into the lens-molding cavity; cooling step for cooling the molten resin for a predetermined time after completion of pressurizing the resin; and die-releasing step comprising a primary die-release operation for lowering the pressure applied to the molten resin inside the lens-molding cavity while keeping substantially constant relative position between the cavity forming member of the movable die and the cavity forming member of the fixed die for a predetermined time after completion of cooling the molten resin and an actual die-release operation for opening the movable die relative to the fixed die.

In the above, in the die-releasing step, the pressure applied to the molten resin inside the lens-molding cavity is lowered after completion of the cooling step while the relative position between the cavity forming member of the movable die and the cavity forming member of the fixed die is kept substantially constant during the primary die-release operation, and the movable die is opened relative to the fixed die. In other words, when the pressure applied to the resin inside the lens-molding cavity is lowered during the primary die-releasing step, the relative position between the cavity forming member of the movable die and the cavity forming member of the fixed die is kept substantially constant, so that the deformation of the molding article can be restrained.

Since the relative position between the cavity forming member of the movable die and the cavity forming member of the fixed die is kept substantially constant in spite of the fact that the pressure applied to the resin is lowered, the deformation of the molding article during the die-releasing step can be reduced even when the cooling step is shortened, thereby obtaining a highly accurate lens molding article. Accordingly, highly accurate lens can be obtained and the molding cycle can be shortened as well.

In the above, during the cooling step, the pressure applied to the molten resin inside the lens-molding cavity may preferably be gradually lowered at a speed slower than the pressure reduction during the die-releasing step while keeping substantially constant relative position between the cavity forming member of the movable die and the cavity forming member of the fixed die for a predetermined time.

According to the above arrangement, since the pressure applied to the molten resin inside the lens-molding cavity is gradually lowered at a slow rate during the cooling step while the cavity forming member of the movable die and the cavity forming member of the fixed die is kept substantially constant, the obtained molding article can be uniformly cooled. As a result, sink mark or strain can be reduced, and the cooling time, entire molding cycle as well, can be reduced.

In the above, the pressure applied to the molten resin inside the lens-molding cavity may preferably be lowered while keeping the change in the space between the cavity forming member of the movable die and the cavity forming member of the fixed die within a difference between the thickness of the lens-molding cavity and the thickness of the article to be molded and ejected at least during the primary die-release operation of the die-releasing step in the die-releasing step and the cooling step.

The difference between the thickness of the lens-molding cavity during compression and the thickness of the ejected molding article ordinarily differs according to the characteristics of the lens material and the lens power.

Specifically, the change in the space between the cavity forming member of the movable die and the cavity forming member of the fixed die may preferably be kept not more than 0.3 mm, preferably not more than 0.2 mm, more preferably not more than 0.1 mm. When the change in the space between the cavity forming member of the movable die and the cavity forming member of the fixed die is greater than the above value, deformation of the molding article is likely.

The arrangement of the second aspect of the present invention may be combined with the arrangement of the first aspect of the present invention.

Further object of the present invention is to provide an injection compression molding method of a lens capable of easily changing the thickness of the lens with low cost and requiring no special additional work.

An injection compression molding method of a lens according to third aspect of the present invention is for molding a lens of a thermoplastic resin, the method comprising the steps of: providing a molding machine having a tie bar for mutually connecting a pair of space-retaining plates, a movable die plate movable along the tie bar, a molding die provided between a first space-retaining plate of the pair of the space-retaining plates and the movable die plate and having a fixed die and a movable die moving toward and away from the fixed die, the fixed die and the movable die respectively having a cavity forming member for shaping concave and convex surface of the lens, the cavity forming member of the fixed die and the cavity forming member of the movable die forming a lens-molding cavity, and an advancement-retraction mechanism provided between a second space-retaining plate of the space-retaining plates and the movable die plate for advancing and retracting the movable die plate relative to the first space-retaining plate, the lens-molding cavity being reduced when the movable die plate advances toward the first space-retaining plate while the molding die is closed; closing the molding die and moving the cavity forming member of the movable die to a position where the thickness of the lens-molding cavity is greater than the thickness of an article to be molded; injecting a thermoplastic molten resin into the lens-molding cavity established in setting the volume of the cavity and sealing in the molten resin injected into the lens-molding cavity; advancing the cavity forming member of the movable die toward the cavity forming member of the fixed die to pressurize the molten resin injected into the lens-molding cavity; cooling the molten resin for a predetermined time after completion of pressurizing the resin; and opening the movable die from the fixed die to eject a molding article, in which the thickness of the molding article is changed by adjusting at least one of the amount of the molten resin injected into the lens-molding cavity and the pressurizing force for pressurizing the molten resin inside the lens-molding cavity.

According to the above injection compression molding method of a lens, the molding die is closed during the cavity volume setting step and the cavity forming member of the movable die is moved to a position where the thickness of the lens forming cavity becomes a predetermined thickness greater than the thickness of the article to be molded while the molding die is closed.

Subsequently, during resin injection seal-in step, the molten resin is injected into the lens-molding cavity. Since the thickness of the lens-molding cavity is enlarged greater than the thickness of the article to be molded, inappropriate resin resistance against the molding die is not generated and injection and filling of the resin can be smoothly conducted during injection of the molten resin. The molten resin injected into the cavity is sealed in the molding die. In other words, the molten resin is prevented from returning (backflowing) to the outside of the molding die.

Next, during resin pressurizing step, the cavity forming member of the movable die is advanced toward the cavity forming member of the fixed die. At this time, since the molten resin is filled and sealed in the molding die including the lens-molding cavity, the molten resin inside the lens-molding cavity is pressurized. Incidentally, the resin pressurizing step may be started after, simultaneously with, or immediately before completion of injecting and filling the resin.

Then, during the cooling step, the molten resin is cooled for a predetermined time after completion of resin pressurizing step. The molten resin inside the lens-molding cavity is cooled while being compressed, and is gradually solidified and shrunk in accordance with the progress in the cooling.

Lastly, in the die-releasing step, the movable die is opened relative to the fixed die after completion of the cooling step, thereby ejecting the molding die.

In the above series of processes of the present invention, a molding article of different thickness can be obtained by adjusting at least one of the amount of the molten resin injected into the lens-molding cavity and the pressurizing force for pressurizing the molten resin inside the lens-molding cavity, so that it is not necessary to provide a plurality of molding dies having cavity thickness corresponding to the thickness of the final product as in a conventional arrangement, thereby easily changing the lens thickness with low cost and no special additional work.

Specifically, in the above arrangement, since the molten resin injected into the lens-molding cavity is sealed in the molding die and is prevented from returning (backflowing) to the outside of the molding die during the resin injection seal-in step, molding article of different thickness can be obtained by adjusting the amount of the molten resin injected into the lens-forming cavity during the resin injection seal-in step and/or the pressurizing force for pressuring the molten resin inside the lens-molding cavity during the resin pressurizing step.

Incidentally, the above arrangement of the third aspect of the present invention may be combined with the arrangement of the first and/or the second aspect of the present invention.

An apparatus for performing the above-described invention may preferably be arranged as follows.

An injection compression molding machine of a lens according to fourth aspect of the present invention includes: a tie bar for mutually connecting a pair of space-retaining plates; a movable die plate movable along the tie bar; a molding die provided between a first space-retaining plate of the pair of space-retaining plates and the movable die plate, the molding die accommodating a lens-molding cavity including a pair of cavity forming members for shaping concave and convex surfaces of a lens; a toggle link mechanism provided between a second space-retaining plate of the pair of space-retaining plates and the movable die plate for advancing and retracting the movable die plate relative to the first space-retaining plate, the lens-molding cavity being reduced when the toggle link mechanism is actuated to advance the movable die plate toward the first space-retaining plate while the molding die is closed; a tie bar extension sensor for detecting the extension of the tie bar; and a space adjuster for adjusting the distance between the pair of the space-retaining plates so that the extension of the tie bar detected by the tie bar extension sensor becomes a desired value when the toggle link mechanism is moved to an extension limit thereof.

According to the above injection compression molding machine, since the tie bar extension sensor for detecting the extension of the tie bar, and a space adjuster for adjusting the distance between a pair of space-retaining plates so that the extension of the tie bar detected by the tie bar extension sensor becomes a predetermined value when the toggle link mechanism is moved to the extension limit are provided to the injection compression molding machine for clamping the die by the toggle link mechanism, the above-described injection compression molding method of the present invention can be performed.

DETAILED DESCRIPTION OF PREFERRED EMBODIMENT(S)

An embodiment of the present invention will be described in detail below with reference to attached drawings.

[Machine Arrangement]

Figure 1:
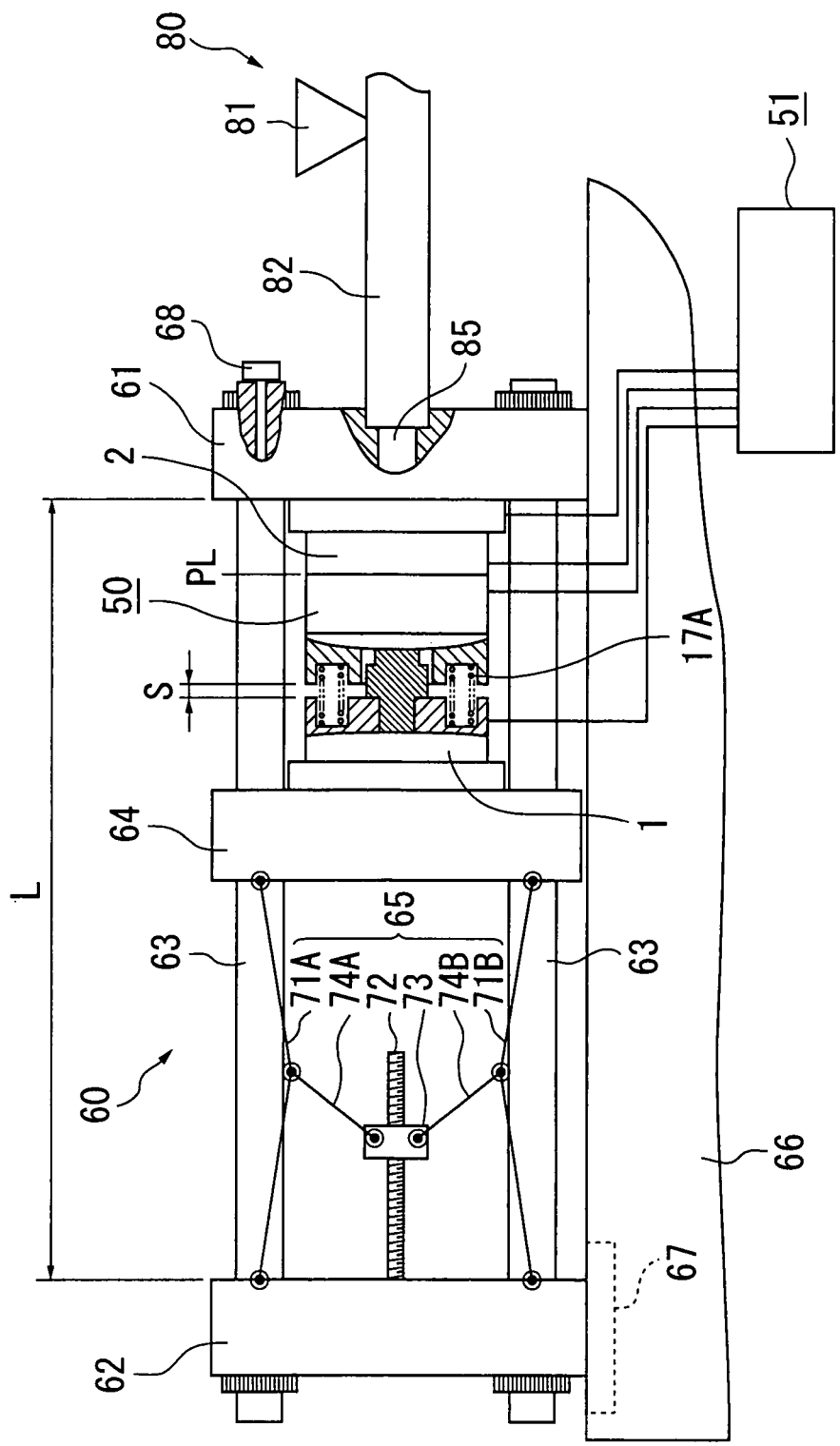
FIG. 1 is an illustration showing an injection compression molding machine applied with a method according to an embodiment of the present invention.

In the present embodiment, the injection compression molding method of the present invention is applied to an injection compression molding machine of a spectacles lens (meniscus-shaped spectacles lens: single-vision, multifocal, or progressive-power) of which entire arrangement is shown in FIG. 1. The material of the spectacles lens molded therein is thermoplastic resin such as PMMA (polymethyl methacrylate) and PC (polycarbonate).

The injection compression molding machine of the present embodiment has a clamping device 60 having a molding die 50, an injection device 80 as an injection means for injecting plasticized and measured material resin to fill the molding die 50 and a die temperature adjuster 51 for controlling the temperature of the molding die at a predetermined temperature.

The clamping device 60 has a fixed die plate 61 and a rear plate 62 as a pair of space-retaining plates, a plurality of tie bars 63 for mutually connecting the fixed die plate 61 and the rear plate 62, a movable die plate 64 movable along the tie bar 63, and a toggle link mechanism 65 as an advancement-retraction mechanism provided between the rear plate 62 and the movable die plate 64 for advancing and retracting the movable die plate 64 relative to the fixed die plate 61. Incidentally, the molding die 50 is provided between the fixed die plate 61 and the movable die plate 64.

The fixed die plate 61 is fixed on a frame 66.

The rear plate 62 is fixed to the frame 66 through a die thickness adjuster 67. The die thickness adjuster 67 is a known device, which is capable of moving the rear plate 62 toward and away from the fixed die plate 61. The die thickness adjuster 67 constitutes a space adjuster for adjusting the distance between the fixed die plate 61 and the rear plate 62 as the pair of space-retaining plates.

Further, since the rear plate 62 connected with the tie bar 63 is slidable through the die thickness adjuster 67, the rear plate 62 can be adjusted with the extension of the tie bar 63.

Further, an extension detecting sensor 68 as a tie bar extension sensor for detecting the extension of the tie bar 63 is provided on the tie bar 63.

The value detected by the extension detecting sensor 68 is displayed on a display (not shown) within a range of 0 to 1000με in the machine of the present embodiment. The extension of the tie bar 63 can be obtained by the detected value (strain) of the extension detecting sensor 68 shown on the display. Specifically, since 1με stands for 1 micro-strain (=0.001 mm extension per 1 m), the extension of the tie bar 63 can be calculated based on the strain shown on the display.

The clamping force [ton] can be calculated based on the following formula.

$$\text{Clamping force [ton]} = \mu\epsilon(\text{displayed strain}) * \text{simplified coefficient}$$

Incidentally, the simplified coefficient can be obtained by the elastic coefficient, the diameter and the number of the tie bar.

The toggle link mechanism 65 has a plurality of toggle links 71A, 71B stretched between the movable die plate 64 and the rear plate 62 and having an intermediate portion capable of being bent inwardly, a ball screw 72 supported at the center of the rear plate 62 in parallel with the tie bar 63 and rotated by a clamping motor (not shown), a crosshead 73 screwed to the ball screw 72, and connection links 74A, 74B connecting the crosshead 73 with the bent portion of the respective toggle links 71A and 71B. Accordingly, when the crosshead 73 is advanced (rightward movement in FIG. 1), the toggle links 71A and 71B are extended through the connection links 74A and 74B. On the contrary, when the crosshead 73 is retracted (leftward movement in FIG. 1), the toggle links 71A and 71B are bent inward through the connection links 74A and 74B (i.e. the movable die plate 64 is retracted). Incidentally, though the toggle-link mechanism has wide variety of mechanism such as double-link mechanism with complicated structure, basic arrangement is used as an example in the description of the present embodiment.

The injection device 80 has an injection cylinder unit 82 for plasticizing, kneading and measuring the material resin loaded from a hopper 81. The injection cylinder unit 82 accommodates a screw (not shown) thereinside and is attached with a long injection nozzle 85 capable of going through into the molding die 50 at a distal end thereof. Incidentally, a band heater (not shown) is wound around the outside of the injection cylinder unit 82.

The die temperature adjuster 51 is connected to respective components of the molding die 50 (insert, insert guide etc.) so that temperature-controlling fluid can be supplied thereto. Specifically, the temperature of the supplied temperature-controlling fluid is controlled so that the respective components of the molding die 50 has the temperature set in accordance with the types of the lens to be molded.

Figure 2:
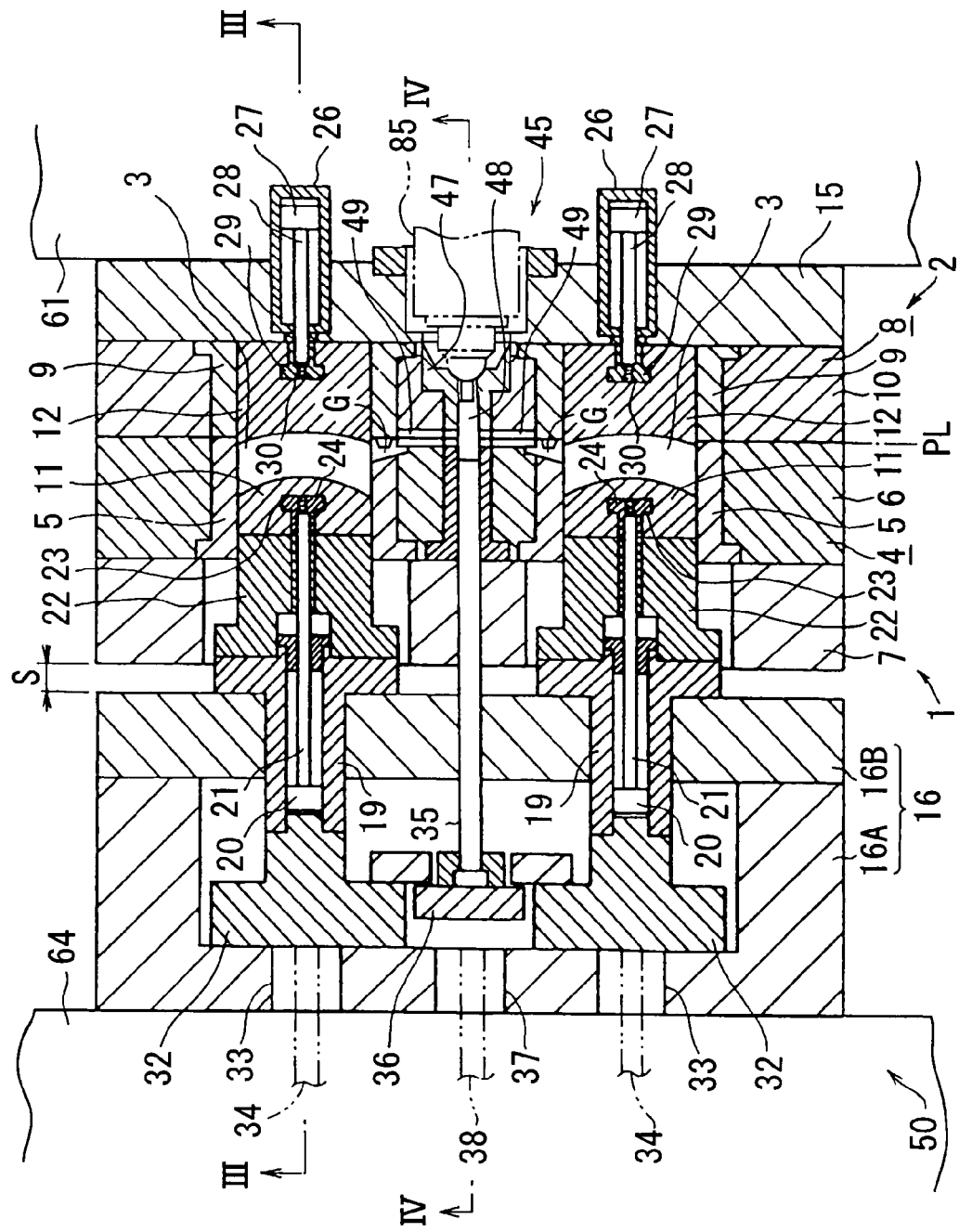
FIG. 2 is a cross section showing a molding die according to the aforesaid embodiment.
Figure 3:
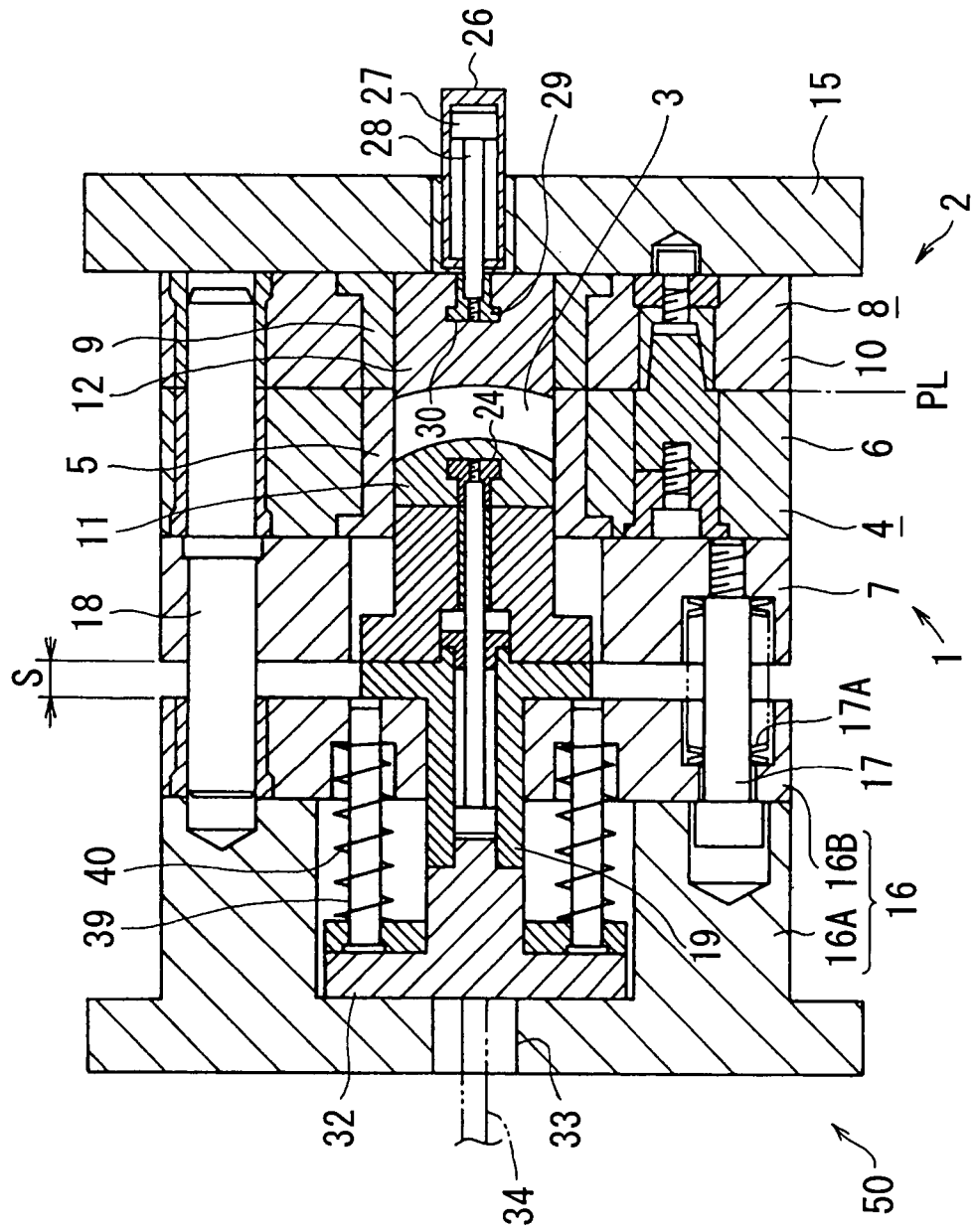
FIG. 3 is a cross section taken along III-III line in FIG. 2.
Figure 4:
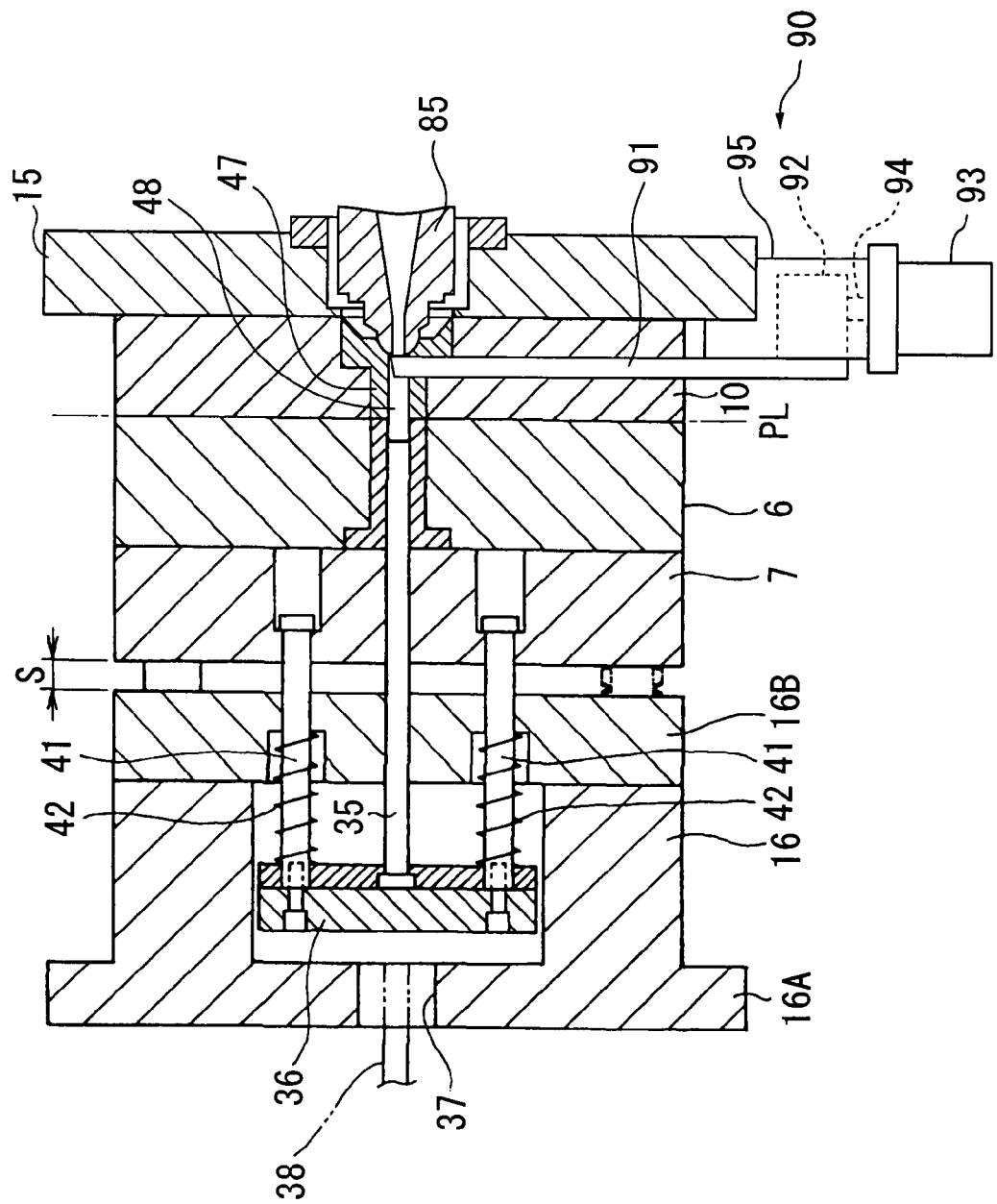
FIG. 4 is a cross section taken along IV-IV line in FIG. 2.

FIG. 2 is a cross section of the molding die 50, FIG. 3 is a cross section taken along III-III line in FIG. 2, and FIG. 4 is a cross section taken along IV-IV line in FIG. 2.

As shown in FIG. 2, the molding die 50 has a movable die 1 and a fixed die 2 separated in right and left direction at a parting line PL. Two spectacles-lens molding cavities 3, and a runner 49 connected to the respective spectacles-lens molding cavities 3 through a gate G to connect the cavities 3 are formed between the movable die 1 and the fixed die 2. A sprue 48 formed by a sprue bush 47 is arranged orthogonally with the runner 49. The two spectacles-lens molding cavities 3, the runner 49 and the sprue 48 are included in a mold set 45. Incidentally, the runner 49 and the sprue 48 form a resin channel inside the molding die 50.

Die body 4 of the movable die 1 is composed of an insert guide 5 and die plates 6 and 7. Die body 8 of the fixed die 2 is composed of an insert guide 9 and a die plate 10. A spectacles-lens molding optical inserts 11 and 12 as a cavity-forming member forming the cavity 3 is accommodated inside the respective insert guides 5 and 9 in a manner slidable in a direction perpendicular to the parting line PL. Though not shown, a temperature-fluid circulation groove for circulating the temperature-controlling fluid supplied by the die temperature adjuster 51 is formed on the insert guides 5 and 9 and the inserts 11 and 12.

The die body 8 of the fixed die 2 is fixed to a die attachment member 15 fixed on the fixed die plate 61. The die body 4 of the movable die 1 is connected to a die attachment member 16 composed of a first member 16A and a second member 16B with a bolt 17 shown in FIG. 3. A coned disc spring 17A is interposed between the die body 4 and the die attachment member 16 as a resilient member inserted to the outer circumference of the bolt 17. The die attachment member 16 is fixed to the movable die plate 64.

A gap S is provided between the die body 4 and the die attachment member 16, and the die body 4 and the die attachment member 16 are capable of being opened and closed in right and left directions by the gap S being guided by a guide pin 18. In other words, by advancing the movable die plate 64 after closing the die, the die attachment member 16 is pressed through the movable die plate 64 to close the gap S.

A hydraulic cylinder 19 is provided to the die attachment member 16. A piston rod 21 connected to a piston 20 of the hydraulic cylinder 19 penetrates an inside of a back insert 22 fixed to an end of the hydraulic cylinder 19 and is provided with a T-shaped clamp member 23 at a tip end thereof. The T-shaped clamp member 23 is engaged with a T-shaped groove 24 formed on the other end of the insert 11 in an engageable and detachable manner. Accordingly, the insert 11 can be exchanged.

A hydraulic cylinder 26 is provided on the die attachment member 15. A piston rod 28 connected to a piston 27 of the hydraulic cylinder 26 penetrates the inside of the die attachment member 15 and is provided with a T-shaped clamp member 29 at a tip end thereof. The T-shaped clamp member 29 is engaged with a T-shaped groove 30 formed on the other end of the insert 12 in an engageable and detachable manner. Accordingly, the insert 12 can be exchanged.

A pressure-receiver 32 is fixed on the other end of the hydraulic cylinder 19. When the pressure-receiver 32 is pressed by an eject rod 34 inserted from a hole 33 formed on the die attachment member 16, the hydraulic cylinder 19, the back insert 22 and the insert 11 are also pressed, so that the lens formed in the cavity 3 is ejected when the movable die 1 and the fixed die 2 are parted.

An eject pin 35 is located at the center of the movable die 1 and the die attachment member 16 in a manner capable of advancement and retraction in right and left directions. A pressure-receiver 36 being displaceable in right and left directions at a predetermined stroke is fixed on an end of the eject pin 35. When the pressure-receiver 36 is pressed by an eject rod 38 inserted from a hole 37 formed on the die attachment member 16, the eject pin 35 is pushed out.

Incidentally, spring force of a spring 40 wound around the outer circumference of an eject return pin 39 works leftward (in the figure) on the pressure-receiver 32. Similarly, as shown in FIG. 4, spring force of a spring 42 wound around the outer circumference of an eject return pin 41 works leftward (in the figure) on the pressure-receiver 36 and the pressure-receiver 36 is positioned at a predetermined location. Accordingly, when the eject rods 34 and 38 are retracted, the pressure-receivers 32 and 36 are also retracted to restore the original position thereof.

A nozzle shut mechanism 90 has a nozzle shut pin 91 as a shutting member as shown in FIG. 4. The nozzle shut pin 91 is inserted to the sidewall of the sprue bush 47 in an advanceable and retractable manner in a direction approximately perpendicular to the central axis of the sprue bush 47 and the rear end thereof is fixed to a piston rod 94 of a hydraulic cylinder 93 through a connection piece 92. The hydraulic cylinder 93 is fixed to the die attachment member 15 through a cylinder attachment plate 95. The backflow of the resin can be prevented by sliding the nozzle shut pin 91 to shut the distal opening of the injection nozzle 85 while the injection nozzle 85 is pressed to the sprue bush 47 (see Japanese Utility-Model Laid-Open Publication Hei 6-9826).

[Lens Molding Process]

Initially, the inserts 11 and 12 are exchanged in accordance with the type of the lens to be molded. When the inserts 11 and 12 are exchanged, the movable die 1 including the die attachment member 16 is retracted to be parted from the fixed die 2. Further, the piston rod 21 of the hydraulic cylinder 19 is advanced and the piston rod 28 of the hydraulic cylinder 26 is advanced, so that the T-shaped clamp members 23 and 29 attached to the tip end of the piston rods 21 and 28 are projected from the insert guides 5 and 9.

Another inserts 11 and 12 to be newly attached to the die bodies 4 and 8 of the movable die 1 and the fixed die 2 are horizontally transferred while holding with a robot arm (not shown) and the T-shaped grooves 24 and 30 of the inserts 11 and 12 are engaged with the T-shaped clamp members 23 and 29. Subsequently, the piston rod 21 of the hydraulic cylinder 19 is retracted to draw in the insert 11 and the piston rod 28 of the hydraulic cylinder 26 is retracted to draw in the insert 12, so that the inserts 11 and 12 are fitted to the insert guides 5 and 9.

Accordingly, the insert is exchanged with an insert capable of forming a cavity 3 having thicker central portion than the peripheral portion thereof for molding a plus lens and to an insert capable of forming a cavity 3 for forming a cavity 3 having thinner central portion than the peripheral portion thereof.

Figure 5:
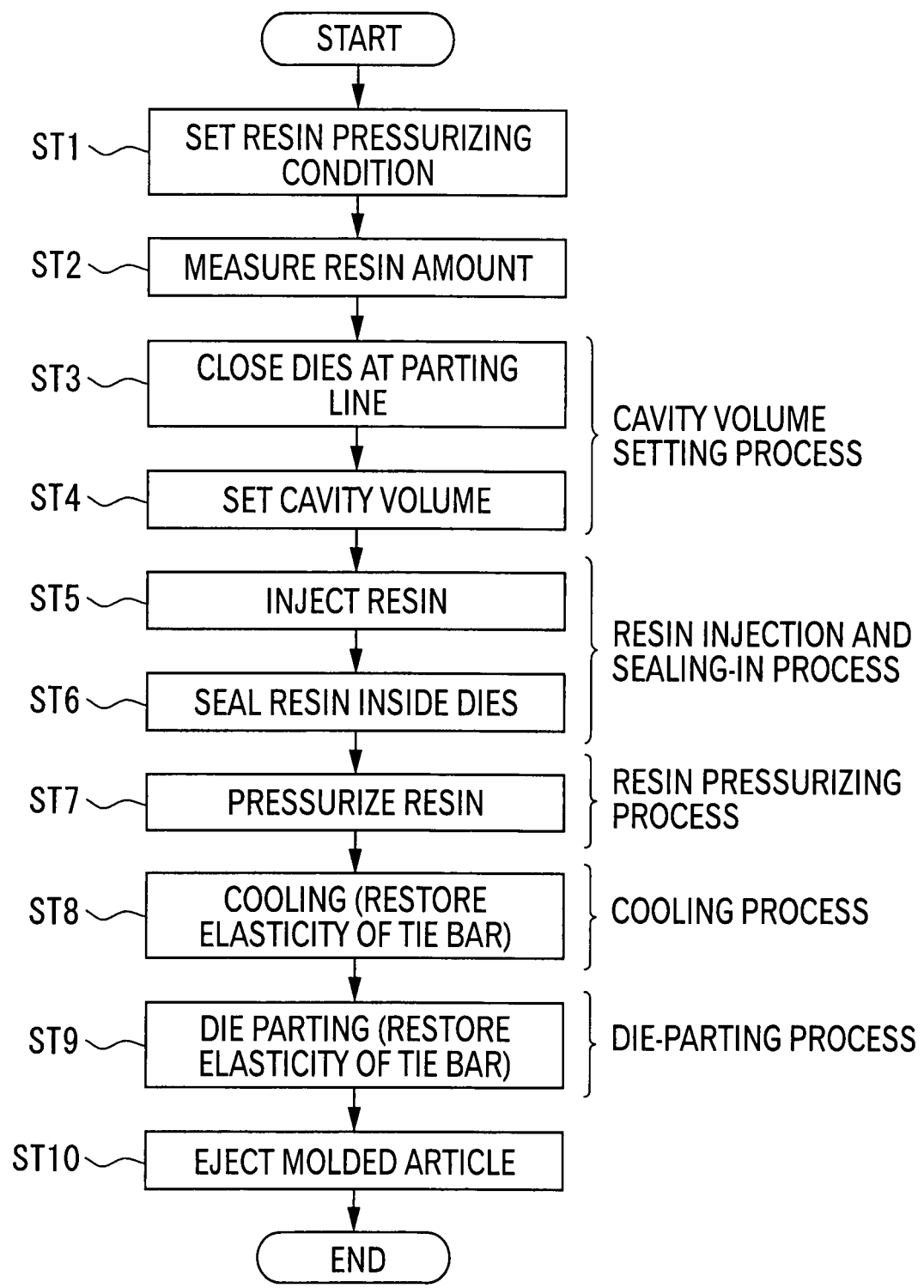
FIG. 5 is a flow chart showing a molding process of a lens in the aforesaid embodiment.

The molding process of a spectacles lens having meniscus-shape is shown in the flowchart of FIG. 5.

Figure 6:
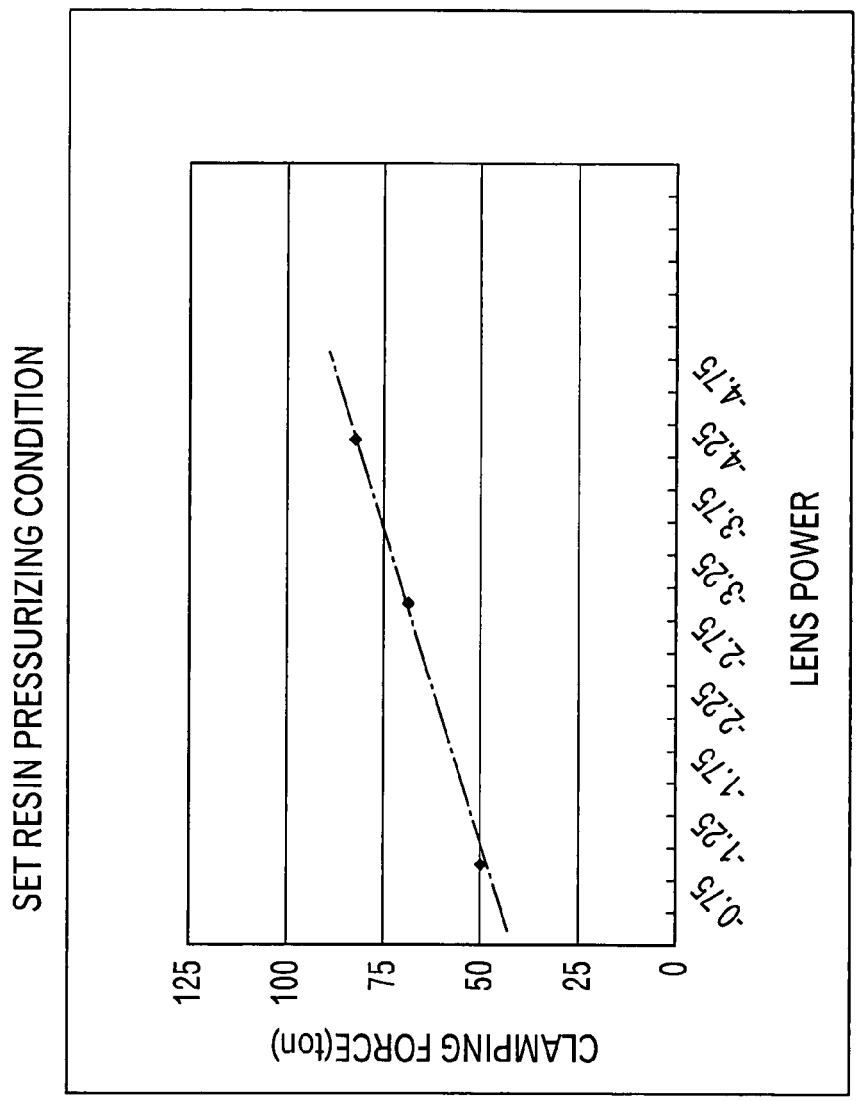
FIG. 6 is an illustration showing a relationship between lens power and clamping force in setting resin pressurizing condition in the aforesaid embodiment.

In ST (step) 1, resin pressurizing condition is set for adjusting clamping force in advance in accordance with the characteristics of the lens to be molded (such as lens shape and lens power) to apply appropriate pressure to the resin inside the cavity 3. For instance, as shown in FIG. 6, appropriate clamping force corresponding to lens power is set, based on which the resin pressurizing condition is set. Of course, it is obvious that the resin pressurizing condition is changed in accordance with the characteristics of the lens resin, which has to be considered in all the molding condition.

Figure 7A:
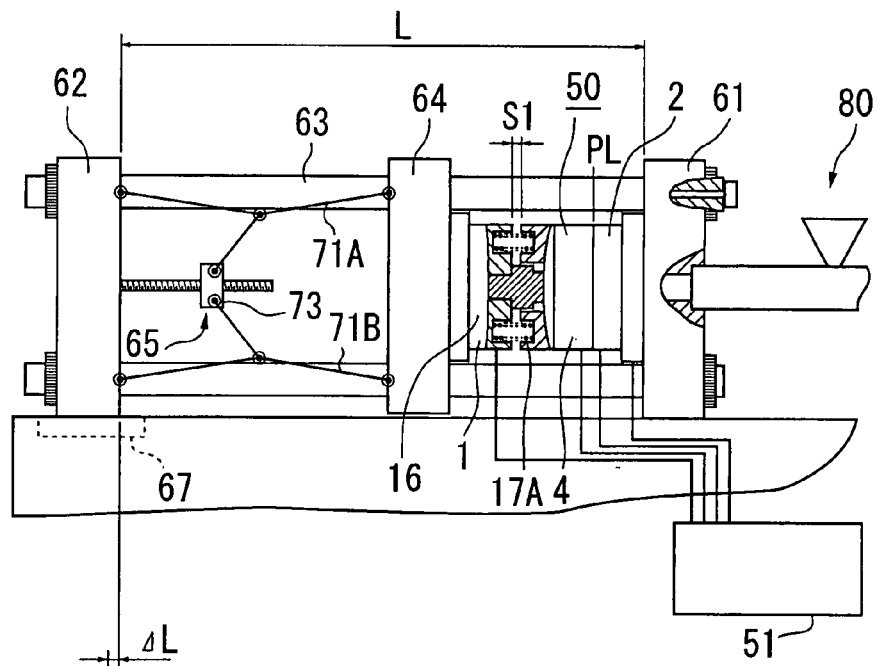
FIGS. 7A and 7B are illustrations showing setting process of the resin pressurizing condition in the aforesaid embodiment.

Initially, as shown in FIG. 7(A), the molding die 50 is closed until the parting line PL is brought into close contact. Specifically, when the crosshead 73 of the toggle link mechanism 65 is advanced toward the movable die plate 64, the toggle links 71A and 71B are stretched to move the movable die plate 64 toward the fixed die plate 61, so that the dies are closed retaining a gap S (S1) while the coned disc spring 17A interposed between the die body 4 of the movable die 1 and the die attachment member 16 is not compressed.

Figure 7B:
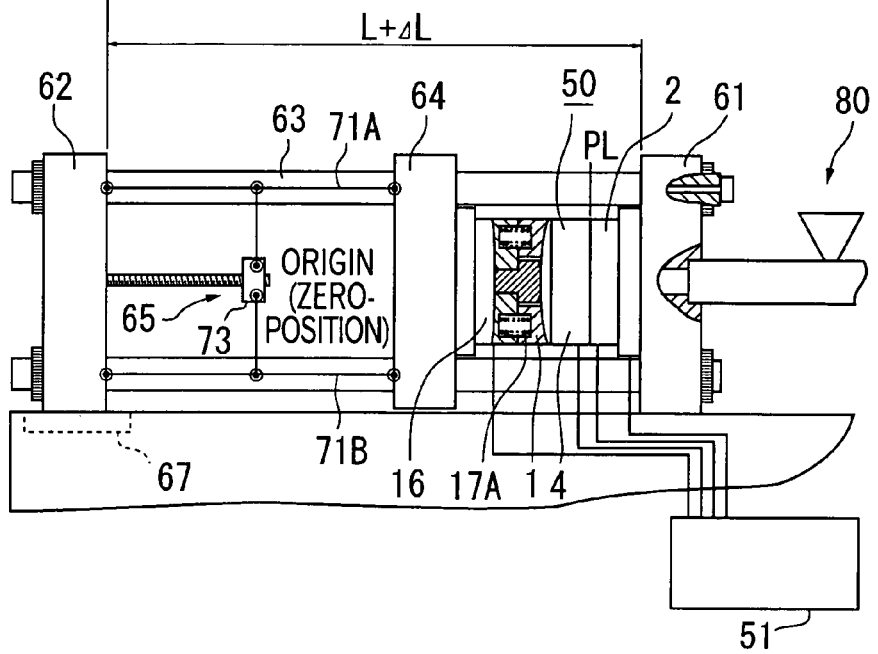
Figure 8:
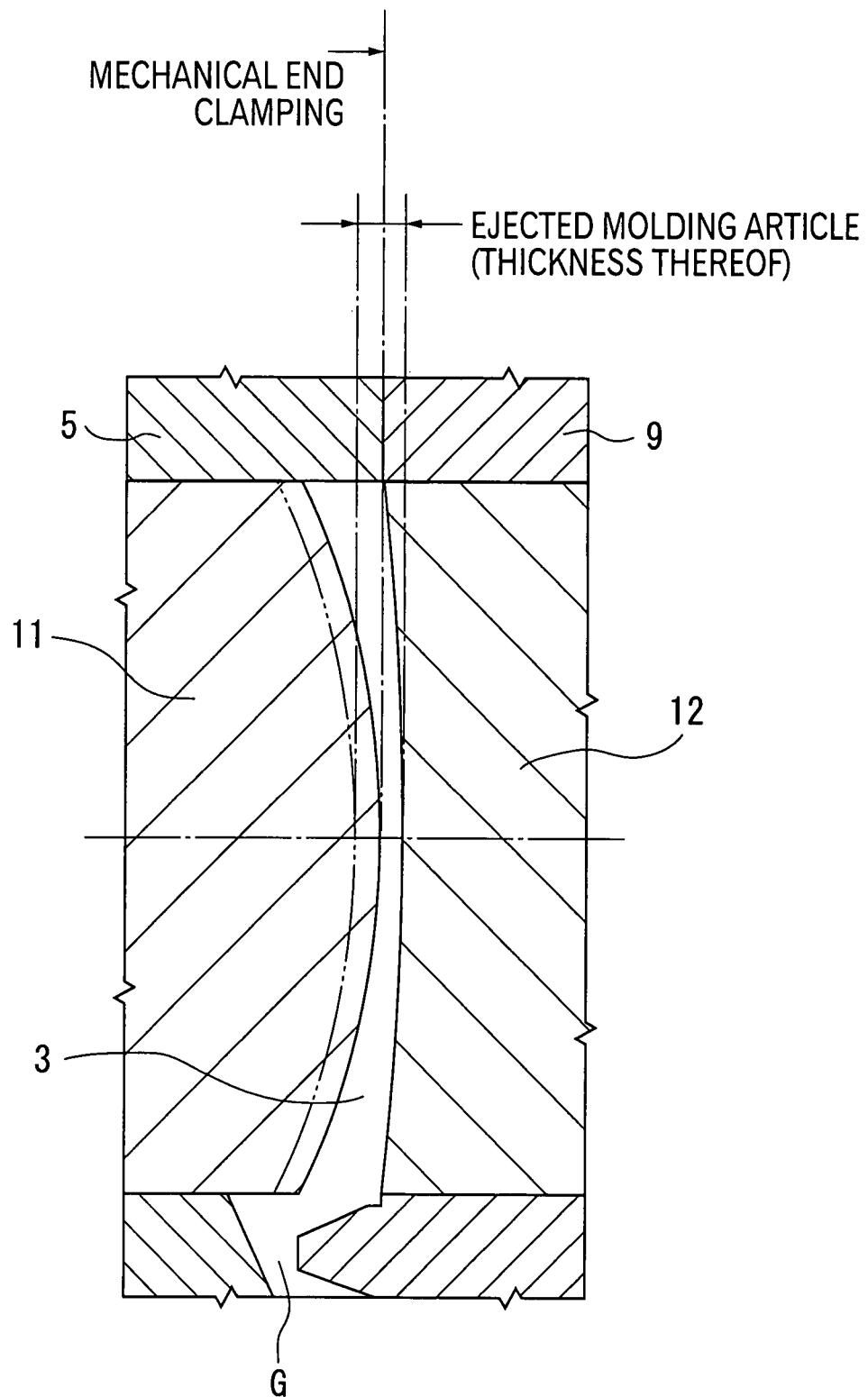
FIG. 8 is an illustration showing a cavity in mechanical-end clamping during resin pressurizing condition setting process in the aforesaid embodiment.

Subsequently, as shown in FIG. 7(B), when the crosshead 73 is further advanced to an origin (zero position), the toggle links 71A and 71B are stretched to the maximum thereof. Then, the tie bar 63 is extended to generate a clamping force. At this time (mechanical-end clamping), the cavity 3 is set smaller than the volume (thickness) of the lens to be molded as shown in FIG. 8. In other words, the cavity 3 is set smaller than the ejected molding product (thickness) during mechanical-end clamping process.

The nearer the crosshead position is located when the dies are closed while the coned disc spring 17A is not compressed relative to the movable die plate 64, the more the toggle links 71A and 71B are stretched, where the tie bar 63 is less stretched and the clamping force is weaker. In other words, since the crosshead position when the dies are closed is determined by the space between the fixed die plate 61 and the rear plate 62, the clamping force is set by adjusting the position of the rear plate 62 by the die thickness adjuster 67.

Here, as shown in FIGS. 7(A) and 7(B), the clamping force is set by controlling the extension ΔL during mechanical-end clamping (condition shown in FIG. 7(B)) relative to the space between the fixed die plate 61 and the rear plate 62 when the molding die 50 is closed at the parting line PL (condition shown in FIG. 7(A)).

In ST2, the resin is measured. In the injection device 80, the material resin loaded into the hopper 81 is plasticized and the plasticized molten resin is introduced into the injection cylinder unit 82 for measurement. Here, the molten resin necessary for the mold set 45 having the two lens-forming cavities 3, the runner 49 and the sprue 48 is measured.

Figure 9:
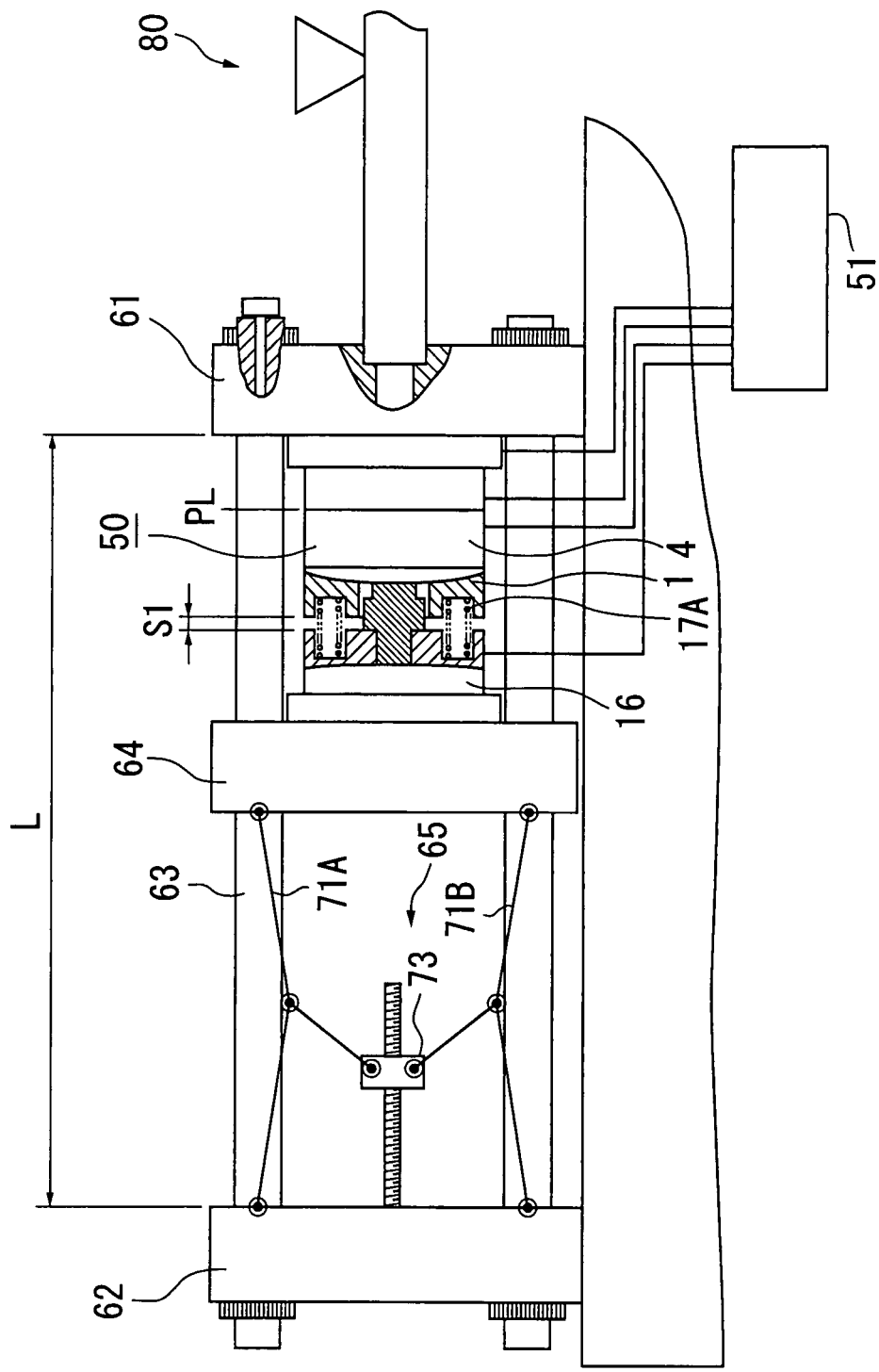
FIG. 9 is an illustration of an entire machine when the dies are closed at a parting line in the aforesaid embodiment.
Figure 10:
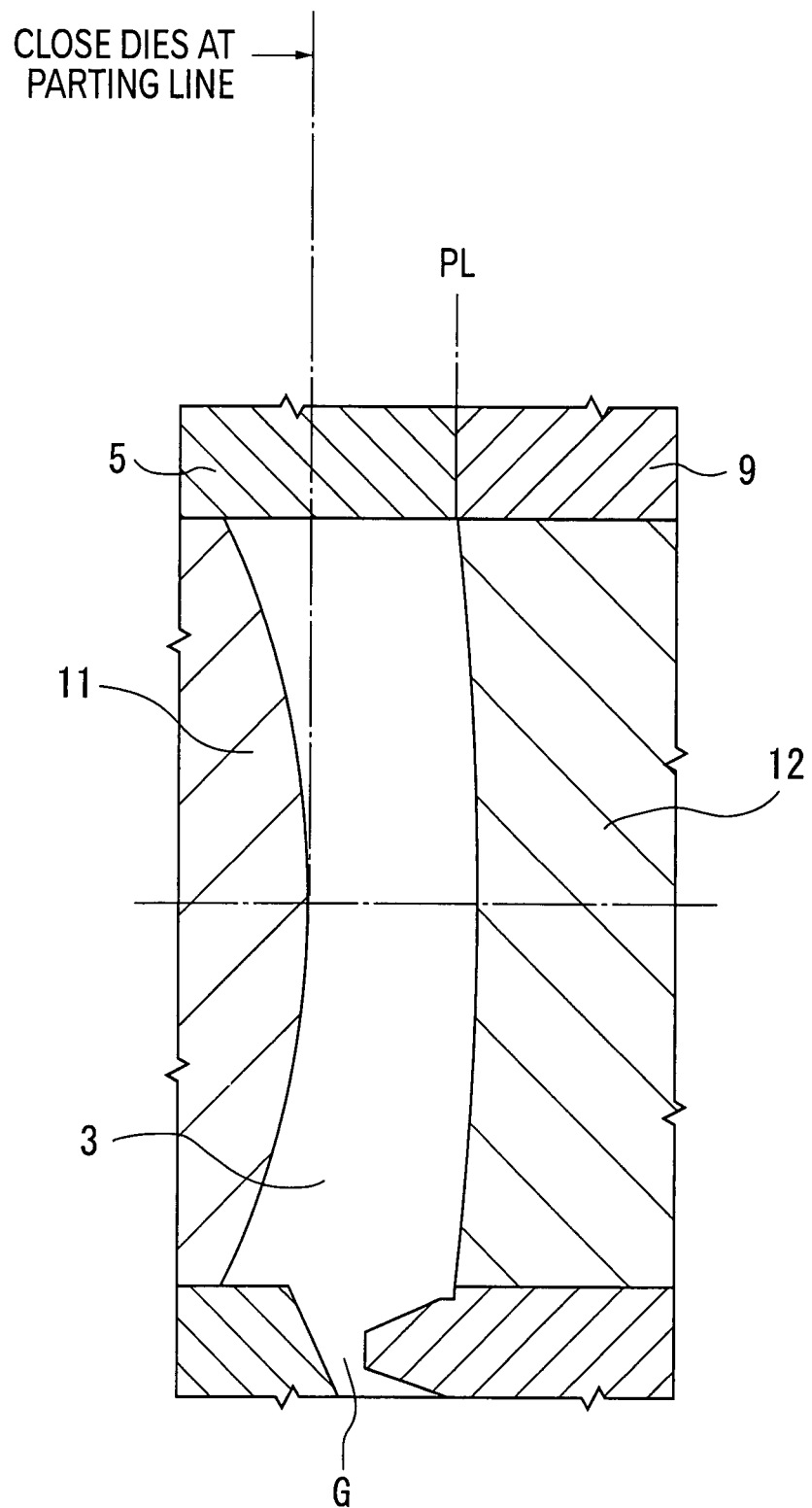
FIG. 10 is an illustration of a cavity when the dies are closed at the parting line in the aforesaid embodiment.

In ST3, the dies are closed at the parting line PL. As shown in FIG. 9, when the crosshead 73 of the toggle link mechanism 65 is advanced, the toggle links 71A and 71B are stretched to move the movable die plate 64 toward the fixed die plate 61, and the molding die 50 is closed at the parting line PL retaining the gap S while the coned disc spring 17A interposed between the die body 4 of the movable die 1 and the die attachment member 16 is not compressed. In this condition, the gap S is set at the maximum (S1). Further, the cavity 3 is set wider than the sum of the thickness of the molding article and enlargement as shown in FIG. 10.

Figure 11:
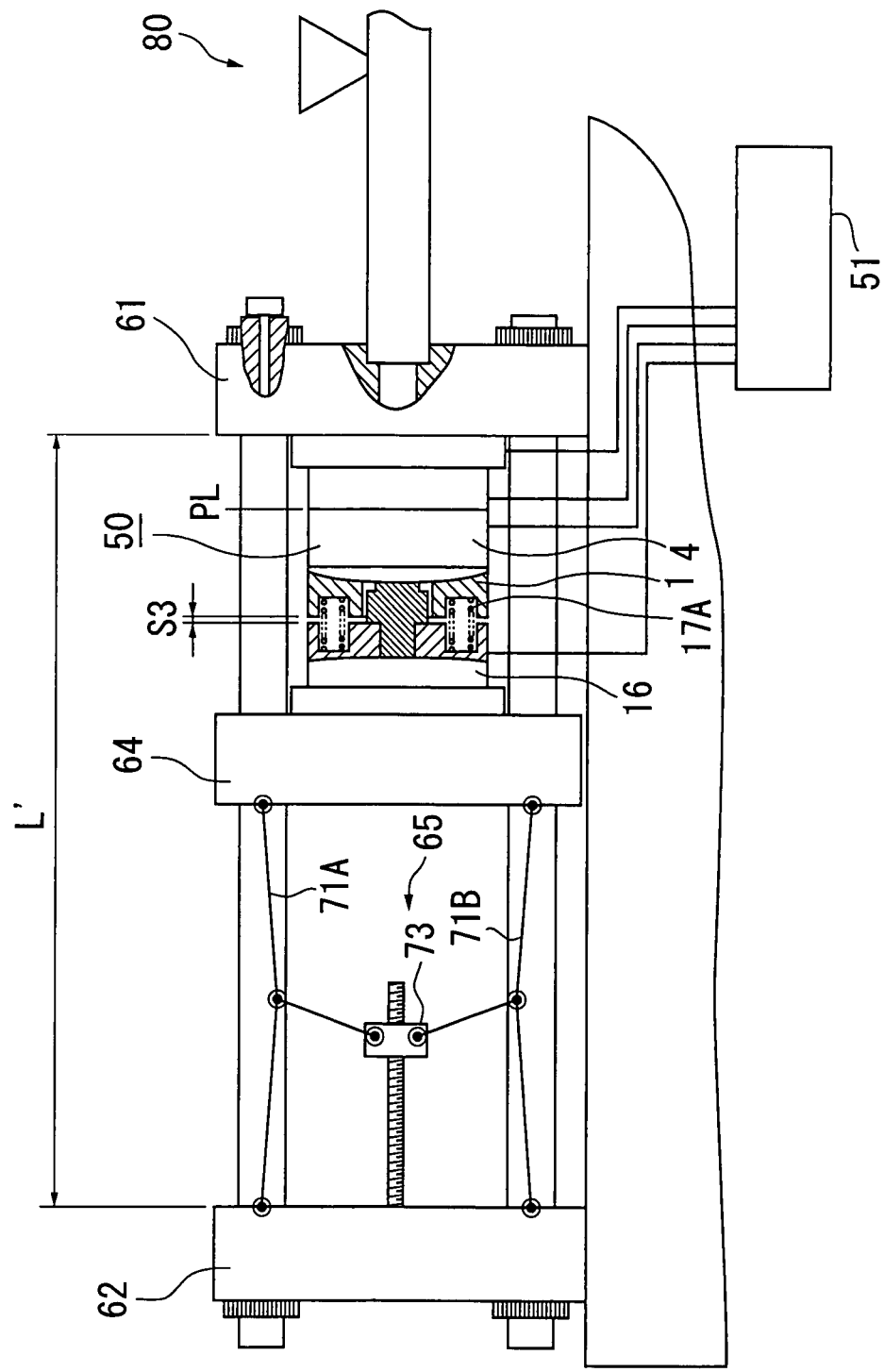
FIG. 11 is an illustration showing the entire machine while setting cavity volume in the aforesaid embodiment.
Figure 12:
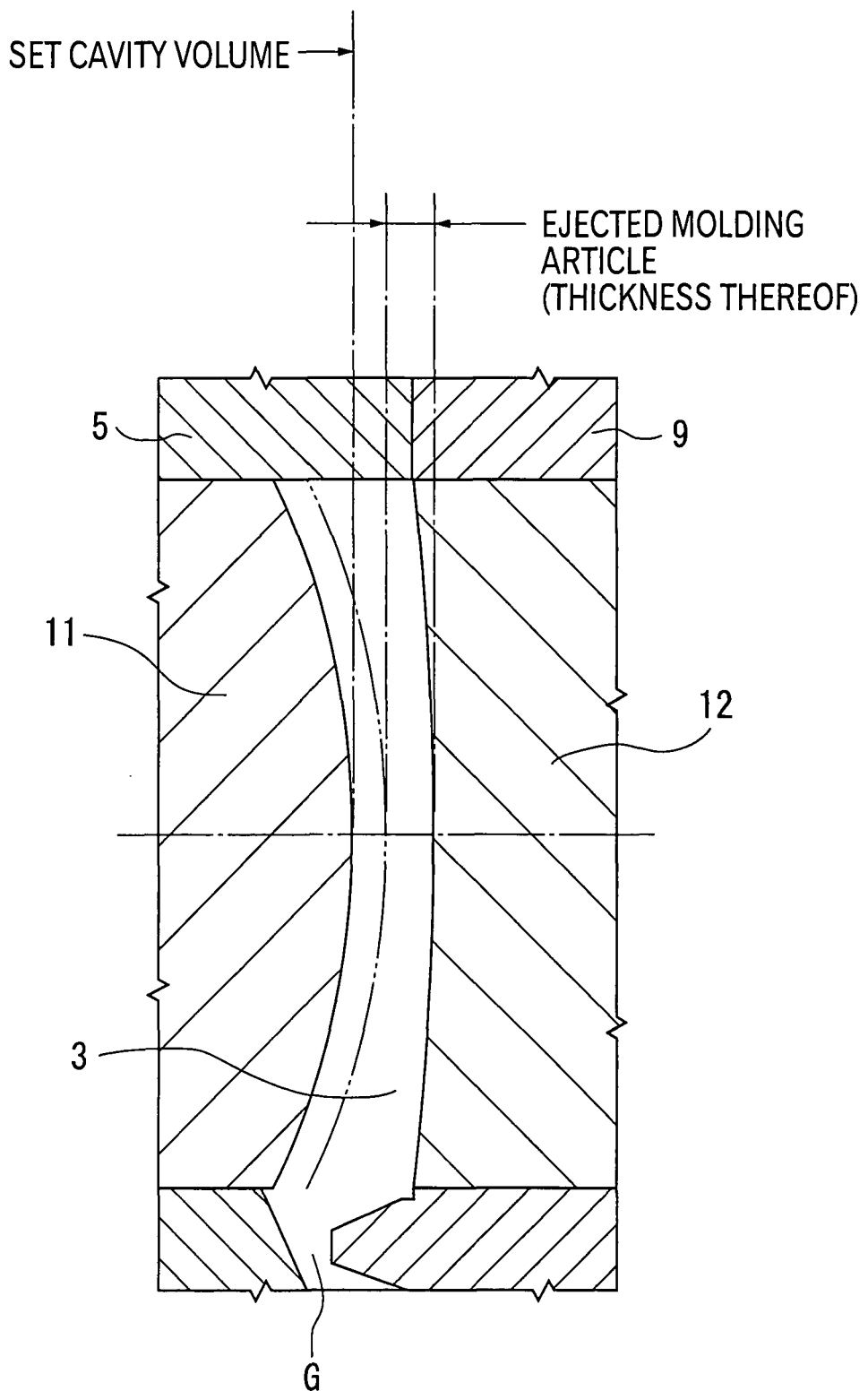
FIG. 12 is an illustration showing the cavity while setting the cavity volume in the aforesaid embodiment.

In ST4, the cavity volume is set. As shown in FIG. 11, when the crosshead 73 is advanced to a predetermined position (cavity volume setting position), the toggle links 71A and 71B are stretched toward the fixed die plate 61 to move the movable die plate 64 to a cavity enlargement position. The cavity enlargement amount is determined according to the setting of the crosshead position. Accordingly, the gap S of the molding die 50 is reduced retaining the cavity enlargement amount (gap S3). At this time, the volume (thickness) of the cavity 3 is greater than the volume (thickness) of the lens to be molded, i.e. the thickness of the molding article to be ejected. Further, since the coned disc spring 17A is compressed, a little clamping force is generated as a reaction force thereof (accordingly, the space between the fixed die plate 61 and the rear plate 62 is L').

In ST5, the resin is injected. The molten resin measured during the measurement process is injected to the mold set 45 through the channel of the injection nozzle 85. Specifically, the molten resin introduced into and measured in the injection cylinder unit 82 of the injection device 80 is injected by rotating a screw. Then, the molten resin is gradually filled into the cavity 3 through the injection nozzle 85, the sprue 48 of the sprue bush 47, the runner 49 and the gate G. When the resin is filled in the cavity 3, the injection speed is controlled to be constant. Since the cavity 3 is greatly enlarged, injection and filling processes are conducted without generating inappropriate resin resistance against the molding die 50.

In ST6, the resin is sealed in the die. The advancement of the crosshead 73 is immediately started just before completing to inject and fill the molten resin, and the injection nozzle 85 is closed by the nozzle shut mechanism 90 immediately after completion of injecting and filling. Specifically, the nozzle shut pin 91 is projected into the sprue 48 to close the distal end of the channel of the injection nozzle 85. Accordingly, the molten resin is sealed in the molding die 50.

In ST7, the resin is pressurized. After the crosshead 73 starts advancement in ST6, when the crosshead 73 advances to the origin (zero-position) to be stopped, the toggle links 71A and 71B are stretched to the maximum thereof, so that the molten resin sealed in the molding die 50 is compressed and pressurized.

Figure 13:
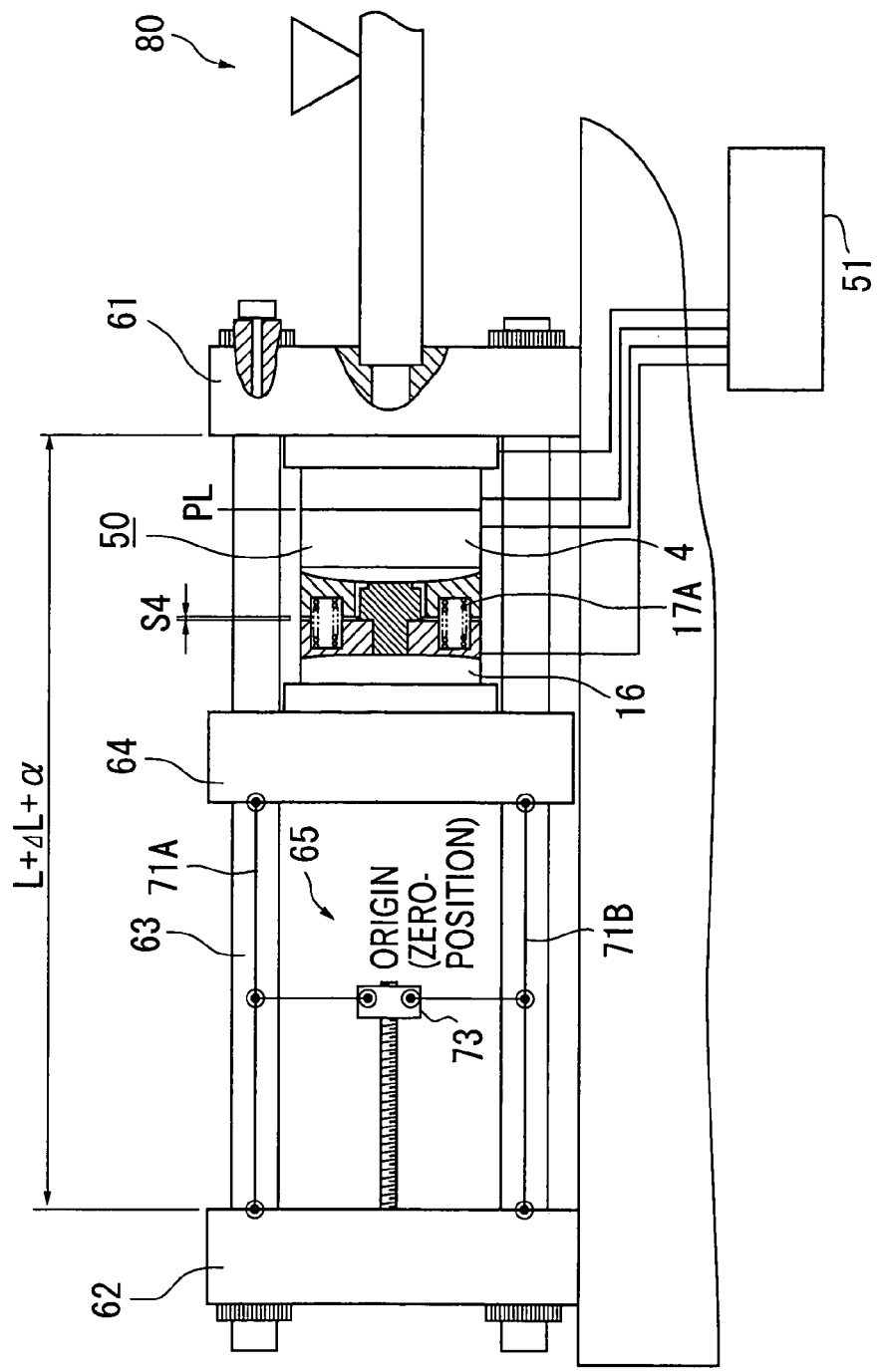
FIG. 13 is an illustration showing the entire machine while pressurizing the resin in the aforesaid embodiment.
Figure 14:
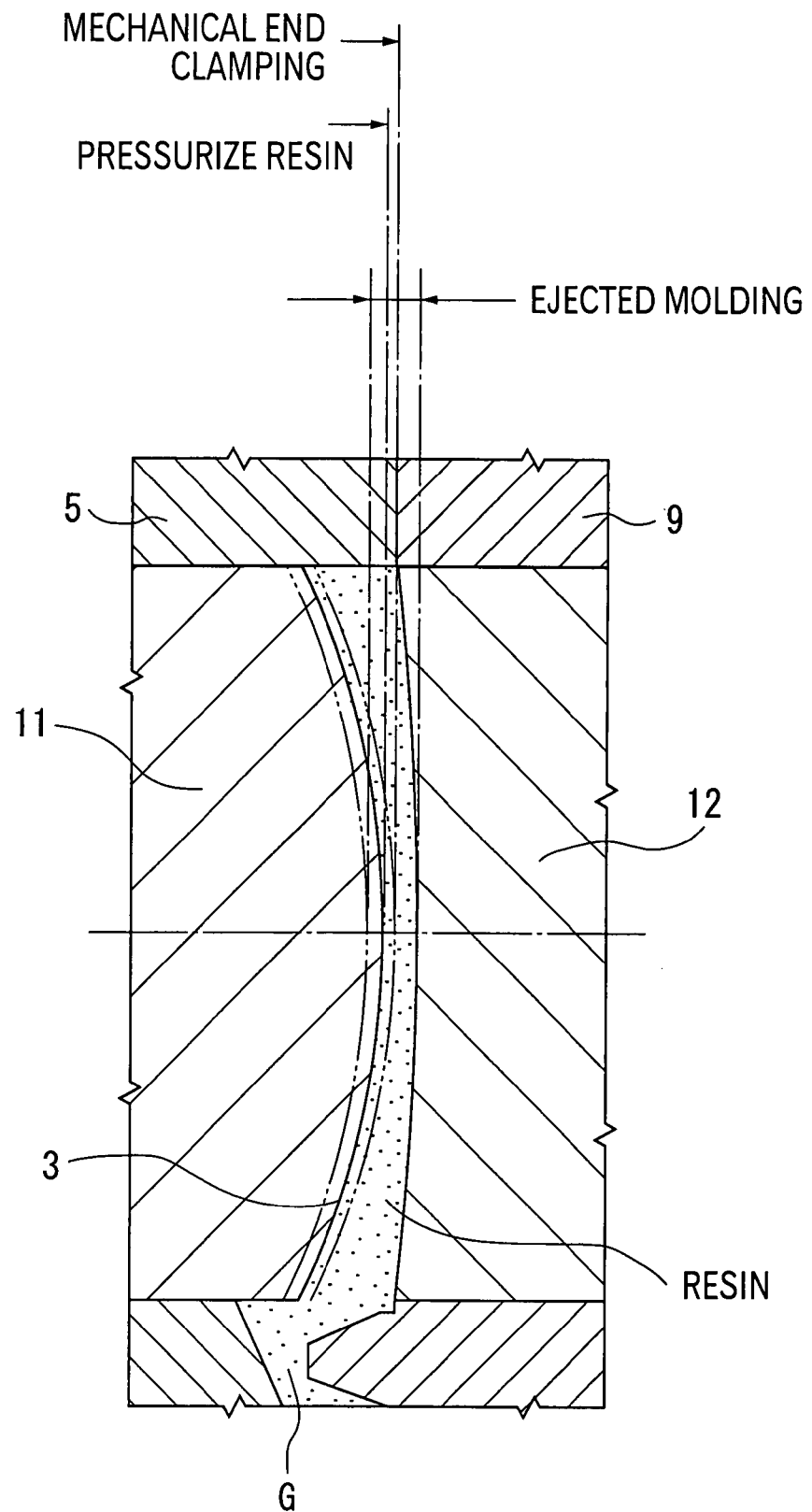
FIG. 14 is an illustration showing the cavity while pressurizing the resin in the aforesaid embodiment.

At this time, as shown in FIG. 13, the cavity volume (thickness) of the molding die 50 when the molding die 50 is closed to mechanical end thereof is set smaller than the volume (thickness) of the lens to be molded, so that the molten resin necessary for the lens to be molded can be filled and the gap S of the molding die 50 is not completely closed to the mechanical end even after compression. Specifically, on account of the gap S4, the insert 11 in contact with the die attachment member 16 directly pushes the resin inside the cavity 3. Accordingly, the resin inside the cavity 3 is compressed to a thickness between the thickness of the ejected molding article and the thickness during mechanical-end clamping as shown in FIG. 14.

Here, the extension of the tie bar 63 indicating the pressure for compressing the resin inside the cavity 3 is a sum (ΔL+α) of the extension (ΔL) of the tie bar 63 on account of clamping force and the extension (α) of the tie bar 63 due to incomplete closing of the molding die 50 on account of the resin volume inside the cavity 3. Accordingly, in order to apply appropriate pressure to the resin inside the cavity 3, the mutually relating resin volume and the clamping force may be appropriately determined in accordance with the characteristics of the lens.

Incidentally, since the molten resin injected into the cavity 3 during the process for injecting and sealing the resin is sealed in the molding die 50 and is prevented from returning (backflowing) to the outside of the molding die 50, molding articles of different thickness can be obtained by adjusting the amount of the molten resin injected into the cavity 3 during the resin injection seal-in step and/or the pressurizing force for pressurizing the molten resin inside the cavity 3 during the resin pressurizing step.

In the present embodiment, the amount of the molten resin injected into the cavity 3 (the amount necessary for the mold set 45 having two lens-molding cavities 3, the runner 49 and the sprue 48) during the resin injection-seal-in process, i.e. the amount of the molten resin for obtaining desired thickness of the molding article, is measured during measurement step in ST2.

In ST8, the cooling step is conducted. Specifically, the temperature of the temperature-controlling fluid is controlled by the die-temperature adjuster 51 so that the respective components (such as insert and insert guide) of the molding die 50 becomes a predetermined temperature below Tg in accordance with the characteristics of the lens to be molded.

The resin filled in the cavity 3 is gradually solidified and shrunk in accordance with the progress in cooling while being compressed. The movable die plate 64 gradually advances in accordance with the shrinkage of the resin. When the movable die plate 64 advances, the space between the fixed die plate 61 and the rear plate 62 are reduced, i.e. the elasticity of the tie bar 63 is recovered, so that the pressure applied to the resin inside the cavity 3 is lowered.

Figure 15:
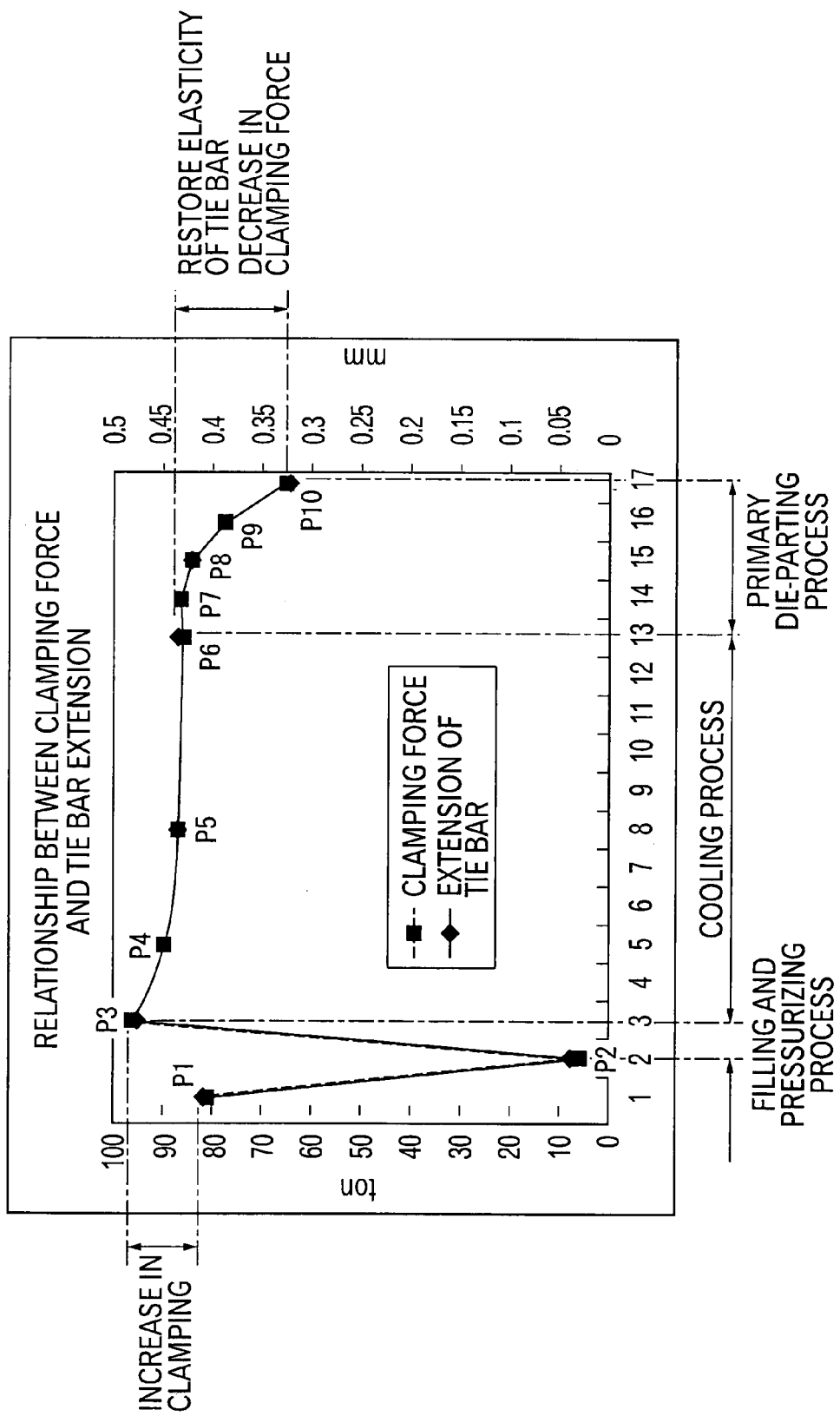
FIG. 15 is an illustration showing a relationship between clamping force and extension of tie bar during cooling step in the aforesaid embodiment.

FIG. 15 shows a relationship between the clamping force during the cooling step and the extension of the tie bar 63. In the figure, point P1 indicates a preset condition of the clamping force which is set in accordance with lens characteristics (aspherical single-vision lens, lens power −4.00 D, diameter 76 mm, central thickness of molded lens 1.1 mm) in advance to injection. The dies are once opened (point P2), and the filling process of the molten resin is started and the dies are clamped, where the clamping force becomes the maximum at a point P3 indicating a point where the toggle links 71A and 71B are fully stretched.

As shown in the figure, the clamping force (pressure applied to the resin inside the cavity 3) and the extension of the tie bar 63 exhibits the same tendency, which are slightly lowered at the initial stage of the cooling step (P3 to P5 section in FIG. 15) but are extremely gently lowered (hardly changed) thereafter (P5 to P6 section).

The section from P6 to P10 is initial stage of die-releasing step (primary step), during which the extension of the tie bar is controlled. In the present invention, it is found that the control during the section greatly influences on the separation failure and lens quality.

In the section from P6 to P8, the clamping force is gradually lowered to control the restoration of the elasticity of the tie bar by gradually lowering the clamping force, and the change in the clamping force is increased at the section from P8 to P10 to recover the elasticity.

Thereafter, the subsequent sections continues to an ordinary actual die-releasing step where the movable plate is further retracted to reduce the clamping force and the dies are opened at a stretch (see U.S. Pat. No. 5,855,824 by the Applicant of the present application).

Incidentally, in order to clarify the border between the cooling step and the die-releasing step, the points P are specified instead of indicating a region.

The relationship between restoration of the elasticity of the tie bar 63 caused by decrease in the clamping force and the cooling time can be obtained by experimentation. Accordingly, the clamping force is controlled by determining an appropriate cooling time considering the material used and the lens characteristics.

Specifically, the cooling time may preferably lengthened in accordance with increase in the lens power, the outer diameter of the lens and the lens thickness.

However, the cooling time may of course be greatly changed considering the lens material.

In ST9, die-release operation is conducted. During the die-release operation, the crosshead 73 of the toggle link mechanism 65 is retracted toward the rear plate 62. When the crosshead 73 is retracted, the toggle links 71A and 71B stretched to the maximum thereof is contracted, so that the elasticity of the tie bar 63 is recovered.

The movable die plate 64 connected with the toggle link 71A and 71B is moved in a direction for the molding die 50 to be opened, i.e. toward the rear plate 62 in accordance with the retraction of the crosshead 73. However, since the rear plate 62 moves toward the fixed die plate 61 due to the restoration of the elasticity of the tie bar 63, the movement of the movable die plate 64 and the contraction of the tie bar 63 due to the recovery of elasticity cancel each other, so that the crosshead 73 continues to be retracted without significant change in the space between the fixed die plate 61 and the movable die plate 64 (i.e. the relative position between the insert 12 of the fixed die 2 and the insert 11 of the movable die 1).

Figure 16:
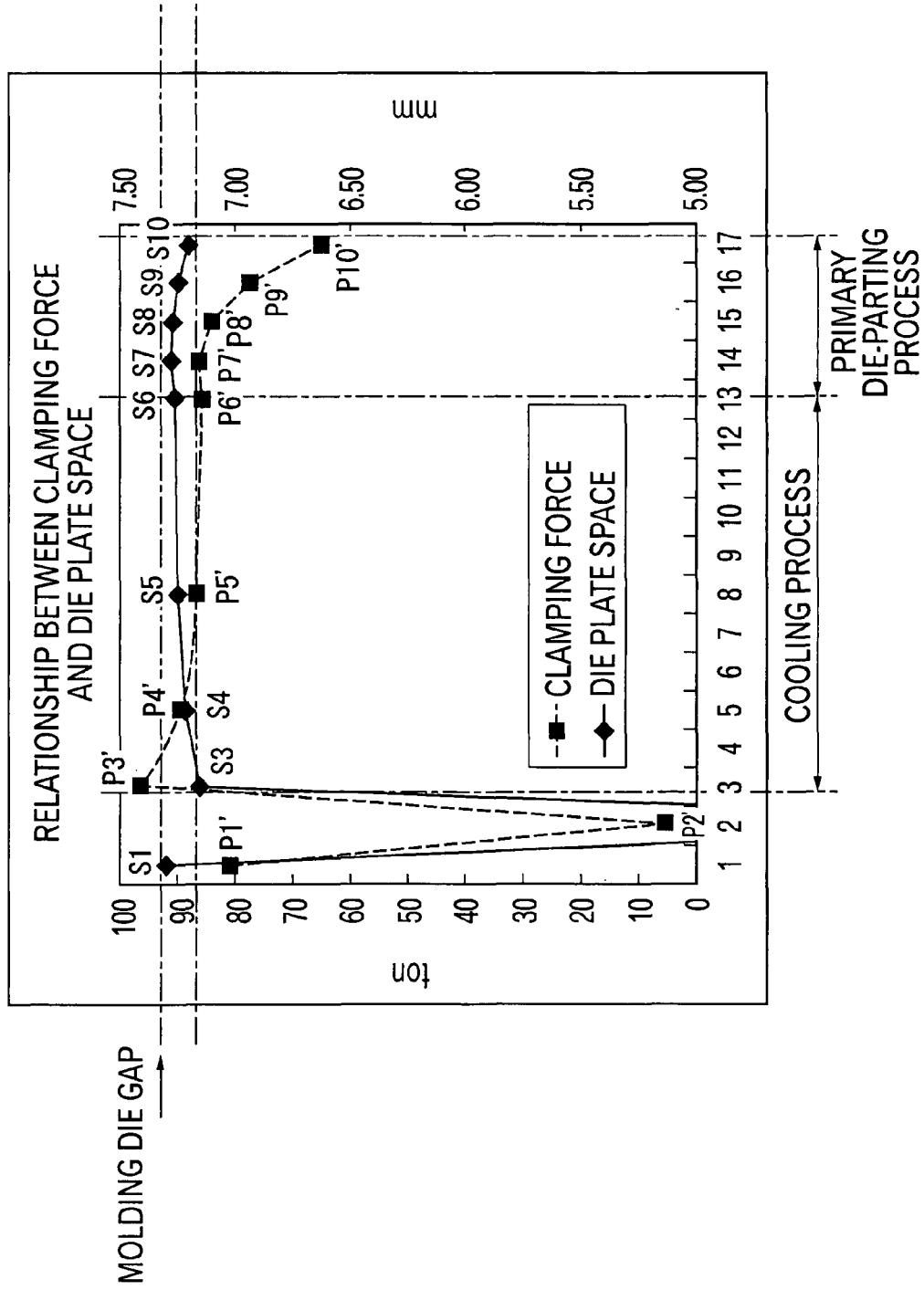
FIG. 16 is an illustration showing a relationship between clamping force and extension of tie bar during the cooling step and a primary die-releasing step in the aforesaid embodiment.

FIG. 16 shows a relationship between the clamping force and the die plate space (the space between the fixed die plate 61 and the movable die plate 64) during the cooling step (the section between S3 and S6, P3' and P6') and the primary die-releasing step (the section between S6 and S10, P6' and P10'). As can be seen from the graph, though the clamping force (the pressure applied to the resin inside the cavity 3) rapidly decreases when entering the primary die-releasing step (the section between the P6' and P10') after completion of the cooling step, the space between the fixed die plate 61 and the movable die plate 64 does not substantially change during the primary die-release operation (the section between S6 and S10). Here, the change in the space between the fixed die plate 61 and the movable die plate 64 (i.e. the space between the insert 12 of the fixed die 2 and the insert 11 of the movable die 1) is maintained within the difference between the thickness of the lens-molding cavity during compression and the thickness of the ejected molding article (e.g. not more than 0.3 mm in the present embodiment).

Accordingly, though the pressure applied to the resin is reduced at the primary die-releasing step, the relative position between the insert 11 of the movable die 1 and the insert 12 of the fixed die 2 is kept substantially constant, so that the pressure applied to the resin inside the die is gently and smoothly reduced, thereby eliminating the deformation of the molding article during die-releasing step to obtain a highly accurate lens molding even when the cooling time is shortened.

Since the pressure applied to the resin inside the cavity 3 can be controlled by adjusting the retraction speed of the crosshead 73, the decrease in the pressure applied to the resin inside the cavity 3 can be controlled by adjusting the retraction speed of the crosshead 73. The appropriate relationship between the retraction of the crosshead 73 and the elasticity recovery of the tie bar 63 is obtained in advance by experimentation, so that the control condition of the crosshead 73 can be determined in accordance with the material to be used and the lens characteristics.

In ST10, molding article is ejected. When the crosshead 73 is retracted to the maximum, the space between the movable die plate 64 and the fixed die plate 61 becomes the maximum, and the molding die is split and opened at the parting line PL, where the molding article is ejected and is separated from the molding die 50.

Figure 17:
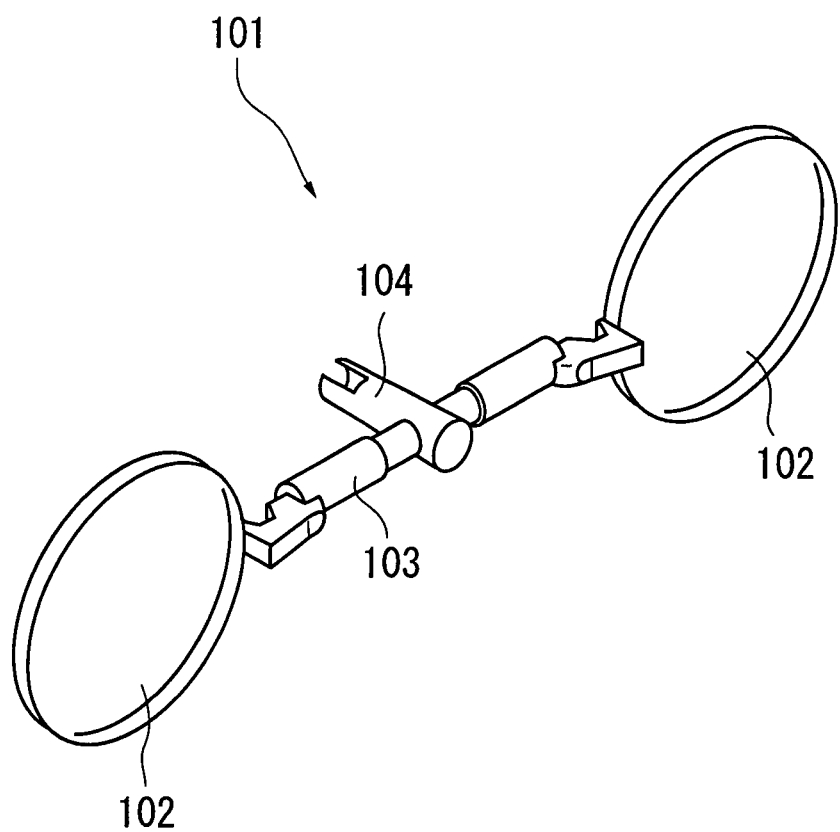
FIG. 17 is a perspective view showing an obtained molding article in the aforesaid embodiment.

A molding article 101 shown in FIG. 17, for instance, can be obtained according to the above series of processes. The molding article 101 is formed of spectacles lenses 102 molded by the two lens-molding cavity 3, a connecting portion molded by the runner 49 for connecting the two spectacles lenses 102, and a rod-shaped portion 104 molded by the sprue 48 extending perpendicular to the central portion of the connecting portion 103 in a thickness direction of the lens 102. The lens 102 is immersed in abrasion resistant hard coating liquid and, thereafter, the lens 102 and the connecting portion 103 are cut by a cutter. Accordingly, two spectacles lenses 102 coated by hard-coat film of the hard-coat fluid can be simultaneously obtained from a single molding article 101.

Effects of the Embodiment

The cavity volume (thickness) is set thicker than the thickness of the molding article in the cavity-volume setting process and the molten resin is injected into the cavity 3 and sealed therein in the resin injection seal-in step. The toggle link mechanism 65 is stretched to extend the tie bar 63 during the resin pressurizing step while the resin is sealed in the molding die 50 and the resin cooling step is conducted while applying the reaction force generated by the extension of the tie bar 63 to the resin inside the cavity 3, so that sink mark and strain of the molding article and molding cycle can be reduced.

Specifically, when the molten resin inside the cavity 3 is cooled for a predetermined time during the cooling step, the molten resin inside the cavity 3 is gradually solidified and shrunk in accordance with the progress in the cooling while being compressed. The movable die plate 64 gradually advances in accordance with the shrinkage of the resin. When the movable die plate 64 advances, the space between the fixed die plate 61 and the rear plate 62 is lessened, i.e. the elasticity of the tie bar 63 is recovered, so that the pressure applied to the molten resin inside the cavity 3 is gradually lowered. Accordingly, as the molten resin inside the cavity 3 is gradually cooled and solidified to be shrunk, the pressure applied to the molten resin inside the cavity 3 can be gradually and gently lowered through the advancement of the movable die plate 64 and the elasticity recovery of the tie bar 63, so that the obtained entire molding article can be uniformly cooled. As a result, sink mark and strain can be reduced, and cooling time, the entire molding cycle as well, can be shortened. For reference, according to the method of the present embodiment, the die-releasing step can be started after eighty seconds of cooling time for molding a lens of 76 mm diameter and −4.00 D (diopter) lens power.

In the die-releasing step, after completing the cooling step, the pressure applied to the molten resin inside the lens-molding cavity 3 is lowered for a predetermined time while the relative position between the insert 11 of the movable die 1 and the insert 12 of the fixed die 2 is maintained substantially constant, and the movable die 1 is parted relative to the fixed die 2. In other words, at the primary die-release operation, since the relative position between the insert 11 of the movable die 1 and the insert 12 of the fixed die 2 is kept substantially constant (where the change in the space between the insert 11 of the movable die 1 and the insert 12 of the fixed die 2 is within the difference between the thickness of the lens-molding cavity being compressed and the thickness of the ejected molding article) even after the pressure applied to the resin inside the lens-molding cavity 3 is lowered, the deformation of the molding article can be restrained.

Since the relative position of the insert 11 of the movable die 1 and the insert 12 of the fixed die 2 is kept substantially constant in spite of the fact that the pressure applied to the resin is lowered, highly accurate lens molding with less deformation can be obtained in the die-releasing step even when the cooling step is shortened. Accordingly, the molding cycle can also be shortened while obtaining highly accurate lenses.

The toggle link mechanism 65 is used as a mechanism for advancing and retracting the movable die plate 64 relative to the fixed die plate 61, the toggle link mechanism 65 being stretched to close the molding die 50. Further, the distance between the fixed die plate 61 and the rear plate 62 is adjusted so that a desired extension of the tie bar 63 can be obtained while the toggle link mechanism 65 is actuated to the most stretched position to set the volume of the cavity 3 at the minimum volume (minimum thickness), thus facilitating the operation during the resin pressurizing step.

Specifically, since the distance between the fixed die plate 61 and the rear plate 62 is adjusted so that the extension of the tie bar 63 becomes a predetermined desired value (ΔL, for instance) when the volume of the cavity 3 is set minimum by driving the toggle link mechanism 65 to the extension limit thereof, it is only necessary for the toggle link mechanism 65 to be moved to the extension limit thereof during the resin pressurizing step. The extension of the tie bar 63 during the resin pressurizing step is equal to the sum of the extension (ΔL) during the clamping force adjusting step and the extension (α) of the tie bar 63 caused on account of incomplete closing of the molding die 50 due to the resin volume inside the cavity 3. Accordingly, the setting the extension (ΔL) considering the extension (α) during the clamping force adjusting step, it is only necessary for the toggle link mechanism 65 to be moved to the extension limit during the resin pressurizing step.

Since the rear plate 62 is moved toward and away from the fixed die plate 61 during the clamping force adjusting step, conventional die thickness adjuster 67 can be used for moving the rear plate 62 toward and away from the fixed die plate 61.

Since the nozzle shut pin 91 is projected into the sprue 48 to shut the nozzle channel for injecting the thermoplastic resin in shutting the resin filled inside the cavity 3, it is only necessary to project the nozzle shut pin 91 to the nozzle channel and the thermoplastic resin can be shut inside the cavity 3 immediately after completing injection of the molten resin inside the cavity 3. Accordingly, backflow of the resin can be prevented even when the resin pressurizing step is started immediately before completing injection.

According to the present embodiment, since a molding article of different thickness can be obtained by adjusting at least one of the amount of the resin injected into the inside of the cavity 3 during the resin injection seal-in step and pressurizing force for pressurizing the molten resin inside the cavity 3 during the resin pressurizing step, it is not necessary to prepare a plurality of molding dies having cavity thickness corresponding to the thickness of the final molding article in order to obtain molding article of different thickness, so that production cost can be reduced and the thickness of the lens can be easily changed without requiring special additional work.

Specifically, since the molten resin injected into the inside of the cavity 3 is sealed in the molding die 50 during the resin injection seal-in step and is prevented from returning (backflowing) to the outside of the molding die 50, molding article of different thickness can be obtained by adjusting the amount of the resin injected into the inside of the cavity 3 during the resin injection seal-in step and/or the pressurizing force for pressurizing the molten resin inside the cavity 3 during the resin pressurizing step.

[Modifications]

The scope of the present invention is not restricted to the arrangement and method described in the above embodiment, but includes following modifications.

Though the toggle link mechanism 65 is used for advancing and retracting the movable die plate 64 relative to the fixed die plate 61, such arrangement is not limiting. Any mechanism provided between the rear plate 62 and the movable die plate 64 for moving the movable die plate 64 toward and away from the fixed die plate 61 may be employed as long as the relative position between the rear plate 62 and the movable die plate 64 can be held constant when the movable die plate 64 is moved toward the fixed die plate 61 and the extension of the tie bar becomes a predetermined value.

Though the mold set 45 includes the two lens-forming cavities 3 in the above-described embodiment, only one lens-molding cavity or more than two lens-forming cavities may be provided.

Though the compression is started immediately before completion of the injection of the molten resin in the above-described embodiment, the compression process may be started simultaneously with or after completion of the molten resin according to the type of the lens to be molded (minus lens and plus lens).

Though the rear plate 62 is moved toward and away from the fixed die plate 61 for adjusting the space between the rear plate 62 and the fixed die plate 61 in the above embodiment, reverse arrangement is possible.

Though the injection compression molding machine of a spectacles lens is used as an example in the above-described embodiment, the molding article is not restricted to a spectacles lens but other general lens can be molded.

What is claimed is:

1. An injection compression molding method of a lens for molding a lens of a thermoplastic resin, comprising:
providing step for providing a molding machine having a tie bar for mutually connecting a pair of space-retaining plates, a movable die plate movable along the tie bar, a molding die provided between a first space-retaining plate of the pair of the space-retaining plates and the movable die plate and having a fixed die and a movable die moving toward and away from the fixed die, the fixed die and the movable die respectively having a cavity forming member for shaping concave and convex surface of the lens, the cavity forming member of the fixed die and the cavity forming member of the movable die forming a lens-molding cavity, and an advancement-retraction mechanism provided between a second space-retaining plate of the space-retaining plates and the movable die plate for advancing and retracting the movable die plate relative to the first space-retaining plate, the lens-molding cavity being reduced when the movable die plate advances toward the first space-retaining plate while the molding die is closed;

cavity-volume setting step for advancing the advancement-retraction mechanism so as to close the molding die and move the cavity forming member of the movable die to a position where the thickness of the lens-molding cavity becomes a predetermined thickness greater than the thickness of the lens to be molded;

resin injection seal-in step for injecting a thermoplastic molten resin into the lens-molding cavity established in setting the volume of the cavity and sealing the molten resin injected to the lens-molding cavity;

resin pressurizing step for advancing the advancement-retraction mechanism so as to advance the cavity forming member of the movable die toward the cavity forming member of the fixed die to compress the molten resin injected into the lens-molding cavity;

cooling step for cooling the molten resin for a predetermined time after completion of pressurizing the resin; and die-releasing step comprising: operating a primary die-release while controlling a retracting speed of the advancement-retraction mechanism after completion of cooling the molten resin, the primary die-release being operated for keeping substantially constant relative position between the cavity forming member of the movable die and the cavity forming member of the fixed die for a predetermined time and lowering the pressure applied to the molten resin inside the lens-molding cavity so that the lowered pressure becomes smaller than a pressure applied during the cooling step; and operating an actual die-release for opening the movable die relative to the fixed die after the primary die-release.

2. The injection compression molding method of a lens according to claim 1,
wherein, during the cooling step, the pressure applied to the molten resin inside the lens-molding cavity is gradually lowered at a speed slower than the pressure reduction during the die-releasing step while keeping substantially constant relative position between the cavity forming member of the movable die and the cavity forming member of the fixed die for a predetermined time.

3. The injection compression molding method according to claim 1,
wherein the pressure applied to the molten resin inside the lens-molding cavity is lowered while keeping any change in the space between the cavity forming member of the movable die and the cavity forming member of the fixed die within a difference between the thickness of the lens-molding cavity and the thickness of the lens to be molded and ejected at least during the primary die-release operation of the die-releasing step in the die-releasing step and the cooling step.

* * * * *